United States Patent [19]
Hsu

[11] Patent Number: 6,138,270
[45] Date of Patent: *Oct. 24, 2000

[54] SYSTEM, METHOD AND MEMORY MEDIUM FOR DETECTING DIFFERENCES BETWEEN GRAPHICAL PROGRAMS

[75] Inventor: Ray Hsu, Austin, Tex.

[73] Assignee: National Instruments Corporation, Austin, Tex.

[*] Notice: This patent is subject to a terminal disclaimer.

[21] Appl. No.: 09/339,340

[22] Filed: Jun. 23, 1999

Related U.S. Application Data

[63] Continuation of application No. 08/870,262, Jun. 6, 1997.

[51] Int. Cl.$^7$ ....................................................... G06F 9/45
[52] U.S. Cl. ................................................................ 717/3
[58] Field of Search ...................................................... 717/3

[56] References Cited

U.S. PATENT DOCUMENTS

| | | | |
|---|---|---|---|
| 4,860,204 | 8/1989 | Gendron et al. | 717/2 |
| 4,901,221 | 2/1990 | Kodosky et al. | 345/348 |
| 5,005,119 | 4/1991 | Rumbaugh et al. | 709/101 |
| 5,423,027 | 6/1995 | Jackson | 714/38 |
| 5,428,788 | 6/1995 | Schwanke | 717/3 |
| 5,440,742 | 8/1995 | Schwanke | 717/3 |

(List continued on next page.)

OTHER PUBLICATIONS

Allen, "The Macintosh Programmer's Workshop," Dr. Dobb's Journal, Sep. 1988.
Allburn, "Letters," Dr. Dobb's Journal, May 1991.
Stevens, "C Programming," Dr. Dobb's Journal, May 1991.
College et al., "Development of a Tool for Comparing User Operation Records in X Window (sic)," 53–6 Society of Inform. Proc. Human Interface Research Center Report, pp. 44–46, 1994.
Coppieters, "A Cross–Platform Binary Diff," Dr. Dobb's Journal, May 1995.
"Of Interest," Dr. Dobb's Journal, Jun. 1995.
Microsoft Press, Computer Dictionary 116–17, 143, 220, 488, 508, 1997.
Continuus Software Corp., ObjectMake Guide: Windows Client 88–90, 1996.

*Primary Examiner*—Tariq R. Hafiz
*Assistant Examiner*—Michael Pender
*Attorney, Agent, or Firm*—Conley, Rose & Tayon, PC; Jeffrey C. Hood

[57] ABSTRACT

A method for detecting differences between two graphical programs. The graphical programs comprise graphical code. The graphical programs may include objects, preferably arranged as a user interface panel, including controls and indicators, and a block diagram, including graphical code function blocks connected together as a data flow program. Directed graph data structures are created to represent the graphical programs, wherein the vertices of the graphs are the objects of the graphical programs and the edges of the graphs are data flow signals of the block diagram and/or hierarchical relationships of the user interface panel objects. The objects of the two graphical programs are heuristically matched together using a scoring approach. The scores are stored in a match matrix and indicate a degree of similarity between an object in the first graphical program and an object in the second graphical program according to one or more criteria. The matching criteria include object type, object connectivity and object attributes. The match matrix is resolved to generate a 1:1 or 1:0 correspondence between the objects in the first and second graphical programs based on the match scores. The matching information is used to determine differences in the two graphical programs. First, using the matching information and a compare engine, the objects are grouped into exact matching subgraphs and then into non-exact matching subgraphs. Non-exact matching subgraphs are matched and merged where possible using transitivity. Objects in the non-exact matching subgraphs are compared using the compare engine to detect additional differences. All detected differences are stored and displayed for the user. The differences may be displayed in various manners such as drawing a circle around the differences, highlighting the differences by color, and/or displaying a textual description of the differences.

92 Claims, 11 Drawing Sheets

U.S. PATENT DOCUMENTS

| | | | |
|---|---|---|---|
| 5,493,682 | 2/1996 | Tyra et al. | 717/3 |
| 5,557,730 | 9/1996 | Frid-Neilson | 345/349 |
| 5,619,638 | 4/1997 | Duggan et al. | 717/3 |
| 5,630,025 | 5/1997 | Dolby et al. | 706/46 |
| 5,659,735 | 8/1997 | Parrish et al. | 707/10 |
| 5,729,744 | 3/1998 | Gerken et al. | 707/203 |
| 5,778,378 | 6/1998 | Rubin | 707/103 |
| 5,805,889 | 10/1998 | Van De Vanter | 717/3 | n x m match matrix

|  | object 0 | object 1 | ... | object m-1 |
|---|---|---|---|---|
| object 0 | match info (0,0) | match info (0,1) |  | match info (0,m-1) |
| object 1 | match info (1,0) | match info (1,1) | ... | match info (1,m-1) |
| object 2 | match info (2,0) | match info (2,1) |  | match info (2,m-1) |
| ⋮ | ⋮ | ⋮ |  | ⋮ |
| object n-1 | match info (n-1,0) | match info (n-1,1) | ... | match info (n-1,m-1) | match info (i,j)

| score | flags |
|---|---|

FIG. 9

SYSTEM, METHOD AND MEMORY MEDIUM FOR DETECTING DIFFERENCES BETWEEN GRAPHICAL PROGRAMS

PRIORITY DATA

This application is a continuation of U.S. patent application Ser. No. 08/870,262 titled "Method for Detecting Differences Between Graphical Programs", filed Jun. 6, 1997 whose inventor was Ray Hsu.

MICROFICHE APPENDIX

The present application includes a microfiche source code appendix comprising a portion of a C language source code listing of one embodiment of the software of the present invention. The appendix comprises 3 microfiche and a total of 201 frames. The appendix is comprised in U.S. Pat. No. 5,974,254 titled "Method for Detecting Differences Between Graphical Programs" which was filed Jun. 6, 1997 as U.S. patent application Ser. No. 08/870,262, the above patent and appendix being hereby incorporated by reference as though fully and completely set forth herein.

FIELD OF THE INVENTION

The present invention relates to graphical programming, and in particular to detecting differences between graphical programs.

DESCRIPTION OF THE RELATED ART

Traditionally, high level text-based programming languages have typically been used by programmers in writing applications programs. Many different high level programming languages exist, including BASIC, C, FORTRAN, Pascal, COBOL, ADA, APL, etc. Programs written in these high level languages are translated to the machine language level by translators known as compilers. The high level text-based programming languages in this level, as well as the assembly language level, are referred to in this disclosure as text-based programming environments.

Increasingly computers are required to be used and programmed by those who are not highly trained in computer programming techniques. When traditional text-based programming environments are used, the user's programming skills and ability to interact with the computer system often become a limiting factor in the achievement of optimal utilization of the computer system.

There are numerous subtle complexities which a user must master before he can efficiently program a computer system in a text-based environment. In addition, the task of programming a computer system to model a process often is further complicated by the fact that a sequence of mathematical formulas, mathematical steps or other procedures customarily used to conceptually model a process often does not closely correspond to the traditional text-based programming techniques used to program a computer system to model such a process. For example, a computer programmer typically develops a conceptual model for a physical system which can be partitioned into functional blocks, each of which corresponds to actual systems or subsystems. Computer systems, however, ordinarily do not actually compute in accordance with such conceptualized functional blocks. Instead, they often utilize calls to various subroutines and the retrieval of data from different memory storage locations to implement a procedure which could be conceptualized by a user in terms of a functional block. In other words, the requirement that a user program in a text-based programming environment places a level of abstraction between the user's conceptualization of the solution and the implementation of a method that accomplishes this solution in a computer program. Thus, a user often must substantially master different skills in order to both conceptually model a system and then to program a computer to model that system. Since a user often is not fully proficient in techniques for programming a computer system in a text-based environment to implement his model, the efficiency with which the computer system can be utilized to perform such modeling often is reduced.

An example of a field in which computer systems are employed to model physical systems is the field of instrumentation. An instrument is a device which collects information from an environment and displays this information to a user. Examples of various types of instruments include oscilloscopes, digital multimeters, pressure sensors, etc. Types of information which might be collected by respective instruments include: voltage, resistance, distance, velocity, pressure, frequency of oscillation, humidity or temperature, among others. An instrumentation system ordinarily controls its constituent instruments from which it acquires data which it analyzes, stores and presents to a user of the system.

Computer control of instrumentation has become increasingly desirable in view of the increasing complexity and variety of instruments available for use. However, when first introduced, computer-controlled instrumentation systems had significant drawbacks. For example, due to the wide variety of possible testing situations and environments, and also the wide array of instruments available, it was often necessary for a user to develop a program to control the new instrumentation system desired. As discussed above, computer programs used to control such improved instrumentation systems had to be written in conventional text-based programming languages such as, for example, assembly language, C, FORTRAN, BASIC, or Pascal. Traditional users of instrumentation systems, however, often were not highly trained in programming techniques and, in addition, traditional text-based programming languages were not sufficiently intuitive to allow users to use these languages without training. Therefore, implementation of such systems frequently required the involvement of a programmer to write software for control and analysis of instrumentation data. Thus, development and maintenance of the software elements in these instrumentation systems often proved to be difficult.

U.S. Pat. Nos. 4,901,221; 4,914,568; 5,291,587; 5,301,301; and 5,301,336; among others, to Kodosky et al disclose a graphical system and method for modeling a process, i.e., a graphical programming environment which enables a user to easily and intuitively model a process. The graphical programming environment disclosed in Kodosky et al can be considered the highest and most intuitive way in which to interact with a computer. A graphically based programming environment can be represented at a level above text-based high level programming languages such as C, Pascal, etc. The method disclosed in Kodosky et al allows a user to construct a diagram using a block diagram editor, such that the diagram created graphically displays a procedure or method for accomplishing a certain result, such as manipulating one or more input variables to produce one or more output variables.

As the user constructs the data flow diagram using the block diagram editor, data structures are automatically constructed which characterize an execution procedure which corresponds to the displayed procedure. The graphical program may be compiled or interpreted by a computer.

Therefore, a user can create a computer program solely by using a graphically based programming environment. This graphically based programming environment may be used for creating virtual instrumentation systems, industrial automation systems, modeling processes, and simulation, as well as for any type of general programming.

Therefore, Kodosky et al teaches a graphical programming environment wherein a user places or manipulates icons in a block diagram using a block diagram editor to create a data flow "program." A graphical program for controlling or modeling devices, such as instruments, processes or industrial automation hardware, is referred to as a virtual instrument (VI). In creating a virtual instrument, a user may create a front panel or user interface panel. The front panel includes various front panel objects, such as controls or indicators that represent or display the respective input and output that will be used by the graphical program or VI, and may include other icons which represent devices being controlled. When the controls and indicators are created in the front panel, corresponding icons or terminals may be automatically created in the block diagram by the block diagram editor. Alternatively, the user can place terminal icons in the block diagram which may later cause the display of corresponding front panel objects in the front panel, either at edit time or at run time.

During creation of the graphical program, the user selects various functions that accomplish his desired result and connects the function icons together. For example, the functions may be connected in a data flow and/or control flow format. The functions may be connected between the terminals of the respective controls and indicators. Thus the user creates or assembles a data flow program, referred to as a block diagram, representing the graphical data flow which accomplishes his desired functions. The assembled graphical program may then be compiled or interpreted to produce machine language that accomplishes the desired method or process as shown in the block diagram.

A user may input data to a virtual instrument using front panel controls. This input data propagates through the data flow block diagram or graphical program and appears as changes on the output indicators. In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators. Alternatively, the front panel may be used merely to view the input and output, and the input may not be interactively manipulable by the user during program execution.

Thus, graphical programming has become a powerful tool available to programmers. Graphical programming environments such as the National Instruments LabVIEW product have become very popular. Tools such as LabVIEW have greatly increased the productivity of programmers and more and more programmers are using graphical programming environments to develop their software applications. In particular, graphical programming tools are being used more frequently for large projects. However, large projects in which multiple software developers are working together often introduces many problems.

One of the problems often encountered when working on large software development projects is keeping track of changes to software programs. With one or two developers working on a project, disciplined efforts to document the changes to the programs may suffice. However, with more developers making changes to the same set of programs, project management becomes exceedingly difficult. In addition, an individual developer may desire to detect changes which he or she has made between two different versions of a program, such as to determine why a bug was introduced or to examine changes made to a template version of the program.

This problem has been solved somewhat satisfactorily for software programs developed in text-based languages. As previously described, text-based software programs are software programs which are written in traditional, i.e., non-graphical, textual-based programming languages such as FORTRAN, Pascal and the C language. In particular, one characteristic of text-based programs is that they are written as text files. That is, typically, the source code of the text-based software program is comprised within a text file, such as an ASCII character set text file. Thus, the constructs such as blocks, functions, statements, operations, etc. of text-based software programs are represented as words or numbers or combinations thereof.

Software utilities have been written to detect changes between two different versions of a text-based software program. The utilities typically take as input two source code text files, each containing a different version of the program, and parse through the characters of the text files comparing each character to detect the differences in the characters between the two text files. The differences in characters are then displayed so that the user can readily discern the difference between the characters of the two programs. An example of such a utility for text-based programs is the "diff" utility commonly found in various versions of the UNIX® operating system.

While a utility such as "diff" may require skill to develop, the basic concept of parsing through the characters of text files and comparing their differences is relatively straightforward. However, the problem of keeping track of changes in graphical programs is a much more difficult problem since graphical programs comprise graphical representations of programming constructs. As previously mentioned, graphical programs typically comprise functional blocks graphically represented as icons, not as text. A graphical program also may include control/indicator icons for providing and/or displaying data input to and output from the graphical program. Thus far, no solutions to this problem have been provided with respect to graphical programs. Therefore, a system and method for detecting differences between different versions of a graphical program are desired.

SUMMARY OF THE INVENTION

The present invention provides a method for detecting differences between two graphical programs. Preferably, the method is executed on a computer system including a display screen and an input device. In one embodiment, the graphical programs are used to control instruments or other devices coupled to the computer system. The first graphical program comprises a first plurality of objects and the second graphical program comprises a second plurality of objects. The objects include attributes and methods and have a specific object type. Preferably, the objects are represented visually as icons in a user interface panel and/or block diagram. The user interface panel is used to provide input to and receive output from the graphical program. The block diagram comprises graphical code including user interface panel terminals and functions blocks connected by data flow paths, or signals, to perform the desired functions of the graphical program. The block diagram receives input for the graphical code from the user interface panel and provides output of the graphical code to the user interface panel. The graphical programs also include attributes themselves.

The method comprises first creating data structures to represent the first and second graphical programs. Preferably, the data structures include a directed graph for each of the block diagrams and user interface panels of each of the graphical programs. The vertices of the graphs correspond to the objects of the block diagram or user interface panel. The edges of the block diagram graph correspond to the data flow paths. The edges of the user interface panel graph indicate the hierarchical relationships of the user interface panel objects, such as parent/child relationships in data aggregation clusters.

The method further comprises a step of matching the first plurality of objects of the first graphical program with the second plurality of objects of the second graphical program. The method attempts to match objects of the graphical programs to determine similarities between the two programs, and hence to aid in finding differences between them. Preferably, the matching is performed according to a matching heuristic which calculates scores indicating a degree of similarity between an object in the first graphical program and an object in the second graphical program according to one or more criteria. These scores, or matching information, are stored in a match matrix data structure. The rows of the match matrix correspond to the objects of the first graphical program and the columns of the match matrix correspond to the objects of the second graphical program. The matching is performed for both the block diagram graphs and the user interface panel graphs.

Pairs of objects (i.e., one from each of the graphical programs) are scored which match according to object type and which have no conflicts with other objects according to object type. Using these matching objects as starting points, the graphs are traversed looking for matching edges. The score of the source and destination objects of matching edges are updated accordingly. The matrix is then resolved by selecting the highest score in a given row or column. That is, in a given row, for example, the object corresponding to the column element in the match matrix with the highest score is selected to match the object corresponding to the given row. The other elements in the row are then zeroed out to indicate the resolved match. If a tie in scores exists at this point, the tie is not resolved, but postponed until a later step. Thus, when the match matrix is eventually resolved with all ties broken, a 1:1 or 1:0 relationship exists between objects in the first graphical program and objects in the second graphical program, the relationship depending upon whether or not an object in the first graphical program has a matching object in the second graphical program.

After the matrix is resolved as described above, yet unmatched objects are scored according to object type only, and the match matrix is resolved again where possible. Next, any remaining conflicts are scored by examining the immediately neighboring objects of the graphs and the match matrix is resolved again where possible. Next, any remaining conflicts are scored by object attributes using a compare engine which includes specific knowledge of the attributes of each of the object types and the match matrix is resolved. Finally, the remaining conflicts are scored by the positions and sizes of the objects. After this step, the matrix is resolved and tie scores are resolved.

The method then determines differences between the first graphical program and the second graphical program in response to the matching step. First, objects which match exactly are grouped into lists of matching subgraphs. Objects match exactly if they are of the same object type, their attributes match, and they have matching edges. The remaining objects which do not match exactly are then grouped into lists of non-exact matching subgraphs. The lists of non-exact matching subgraphs are matched using a subgraph match matrix in a similar manner to which the objects themselves were matched using a match matrix. The non-exact matching subgraphs in the subgraph match matrix are scored based upon matching nodes in the original match matrix. The rows and columns of the subgraph match matrix correspond to the subgraphs in the non-exact matching subgraph lists. Considering direct and transitive connections, the non-exact matching subgraphs are merged into composite non-exact matching subgraph lists. The compare engine is then used to compare the individual objects in the non-exact matching subgraphs to determine additional differences. Furthermore, non-exact matching subgraphs, which may be single objects, which have no match in the match matrix are stored as differences. For the user interface panels, top-level objects are compared using the compare engine and then the low-level objects, e.g., the data elements of any clusters, are compared using the compare engine to determine differences. All of the differences determined are stored in a results data structure.

The method further comprises displaying an indication of the stored differences on the display screen of the computer system. In one embodiment, the differences are highlighted by greying out the portions of the block diagram which are not part of the difference and a geometric symbol, such as an ellipse or circle, is drawn around the difference. In one embodiment, the differences are displayed in a distinguishing color. In one embodiment, the differences are surrounded with "marching ants". In one embodiment, displaying the differences includes displaying a text description describing the differences.

BRIEF DESCRIPTION OF THE DRAWINGS

A better understanding of the present invention can be obtained when the following detailed description of the preferred embodiment is considered in conjunction with the following drawings, in which:

FIG. 9 is a block diagram illustrating a match matrix according to a preferred embodiment of the present invention;

Figure 1:
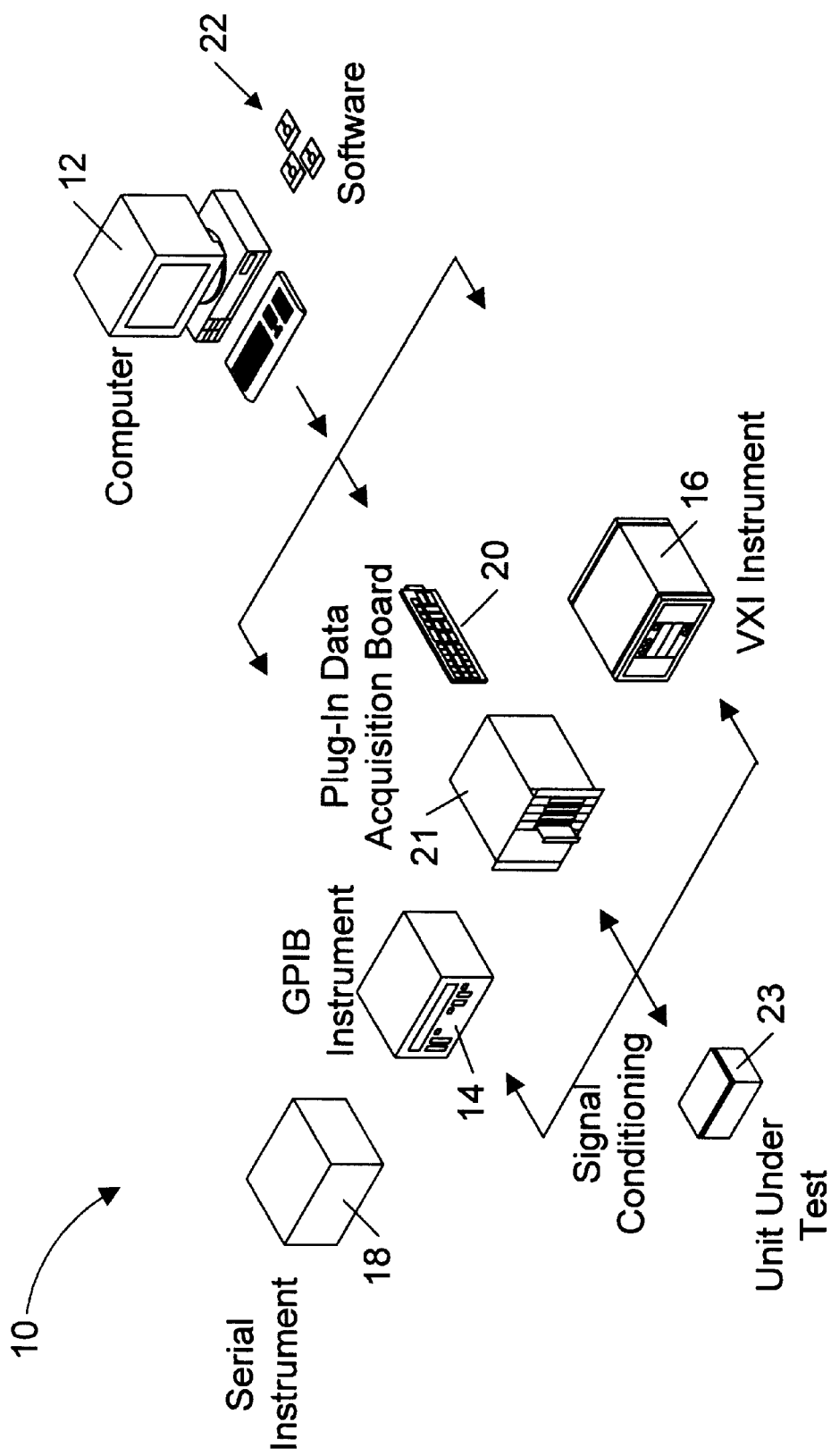
FIG. 1 is an illustration of an instrumentation control system.

While the invention is susceptible to various modifications and alternative forms specific embodiments are shown by way of example in the drawings and will herein be described in detail. It should be understood however, that drawings and detailed description thereto are not intended to limit the invention to the particular form disclosed. But on the contrary the invention is to cover all modifications, equivalents and alternative following within the spirit and scope of the present invention as defined by the appended claims.

DETAILED DESCRIPTION OF THE PREFERRED EMBODIMENTS

The present invention provides a method for detecting differences between two different graphical programs. Although in one embodiment described below the graphical programs control instrumentation hardware, it is noted that graphical programs may be used for a plethora of software applications and are not limited to instrumentation applications. Likewise, the method of the present invention is operable for use in detecting differences in graphical programs written for any application.

FIG. 1—Computer System

Referring now to FIG. 1, an instrumentation control system 10 is shown. The system 10 comprises a computer 12, which connects to one or more instruments. The computer comprises a CPU, a display screen, and one or more input devices such as a mouse or keyboard as shown.

The one or more instruments may include a GPIB instrument 14, a VXI instrument 16, a serial instrument 18 and/or a data acquisition board 20. The GPIB instrument 14 is coupled to the computer 12 via a GPIB interface provided by the computer 12. The VXI instrument 16 is coupled to the computer 12 via a VXI bus or MXI bus provided by the computer. The serial instrument 18 is coupled to the computer 12 through a serial port, such as an RS-232 port, provided by the computer 12. Finally, the data acquisition board 20 is coupled to the computer 12, typically by being plugged in to an I/O slot in the computer such as a PCI bus slot, an ISA bus slot, an EISA bus slot, or a MicroChannel bus slot provided by the computer 12. In typical instrumentation control systems an instrument will not be present of each interface type and in fact many systems may only have one or more instruments of a single interface type, such as only GPIB instruments.

The instruments are coupled to a unit under test (UUT) 23, process or are coupled to receive field signals, typically generated by transducers. The system 10 may be used in a data acquisition and control application, or may instead be used in a test and measurement application. If the system 10 is used in a data acquisition application, the system 10 may also include signal conditioning circuitry 21 coupled between the data acquisition board 20 and transducers.

Figure 2:
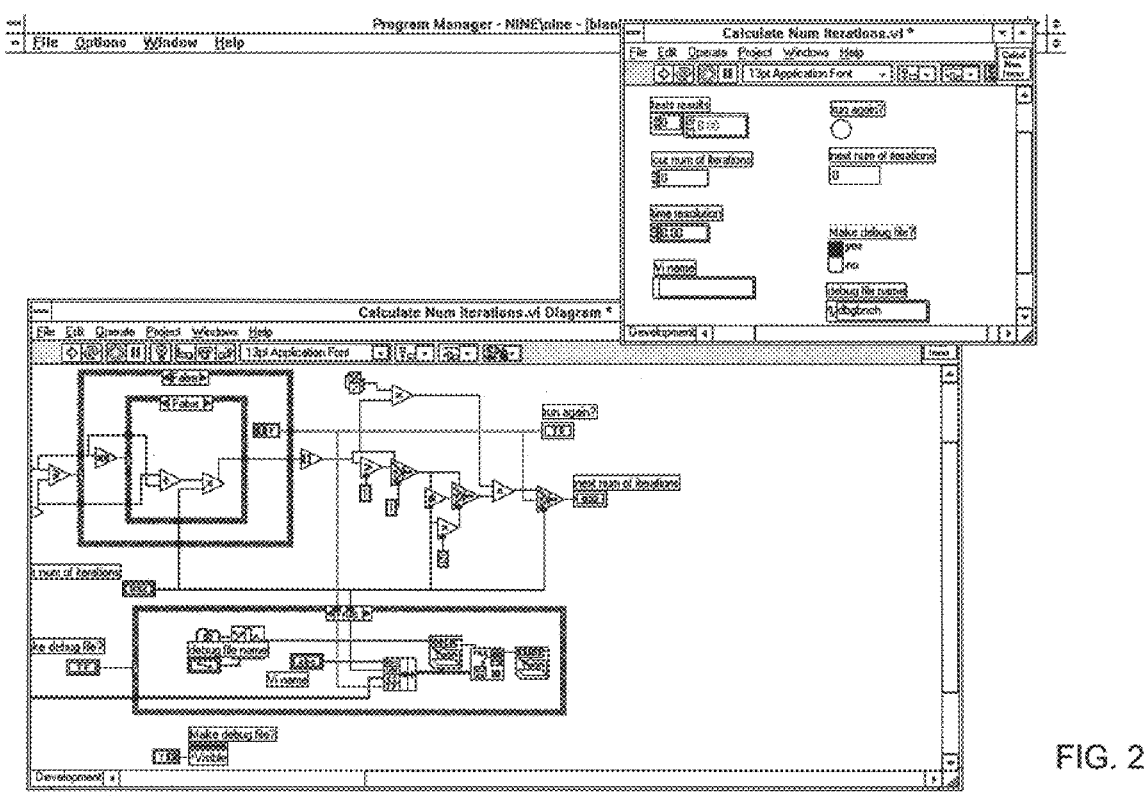
FIG. 2 is a screen shot of an example of a virtual instrument or graphical software program for controlling an instrumentation control system such as in FIG. 1.

The instruments are controlled by graphical software programs which are stored in memory of the computer and which execute on the computer 12. The graphical software programs which perform instrumentation control are also referred to as virtual instruments. FIG. 2 illustrates an example of a virtual instrument or graphical software program. In the embodiment described herein, the graphical programs used herein were created using the LabVIEW graphical programming system.

Referring again to FIG. 1, the system 10 preferably includes a memory media, such as a non-volatile memory, e.g., magnetic media, a system memory, CD-ROM, or floppy disks 22, on which computer programs according to the present invention are stored. The present invention comprises a software program stored on a memory and/or hard drive of the computer 12 and executed by a CPU of the computer. The CPU executing code and data from the memory thus comprises a means for detecting differences in graphical programs according to the steps described below.

Figure 3:
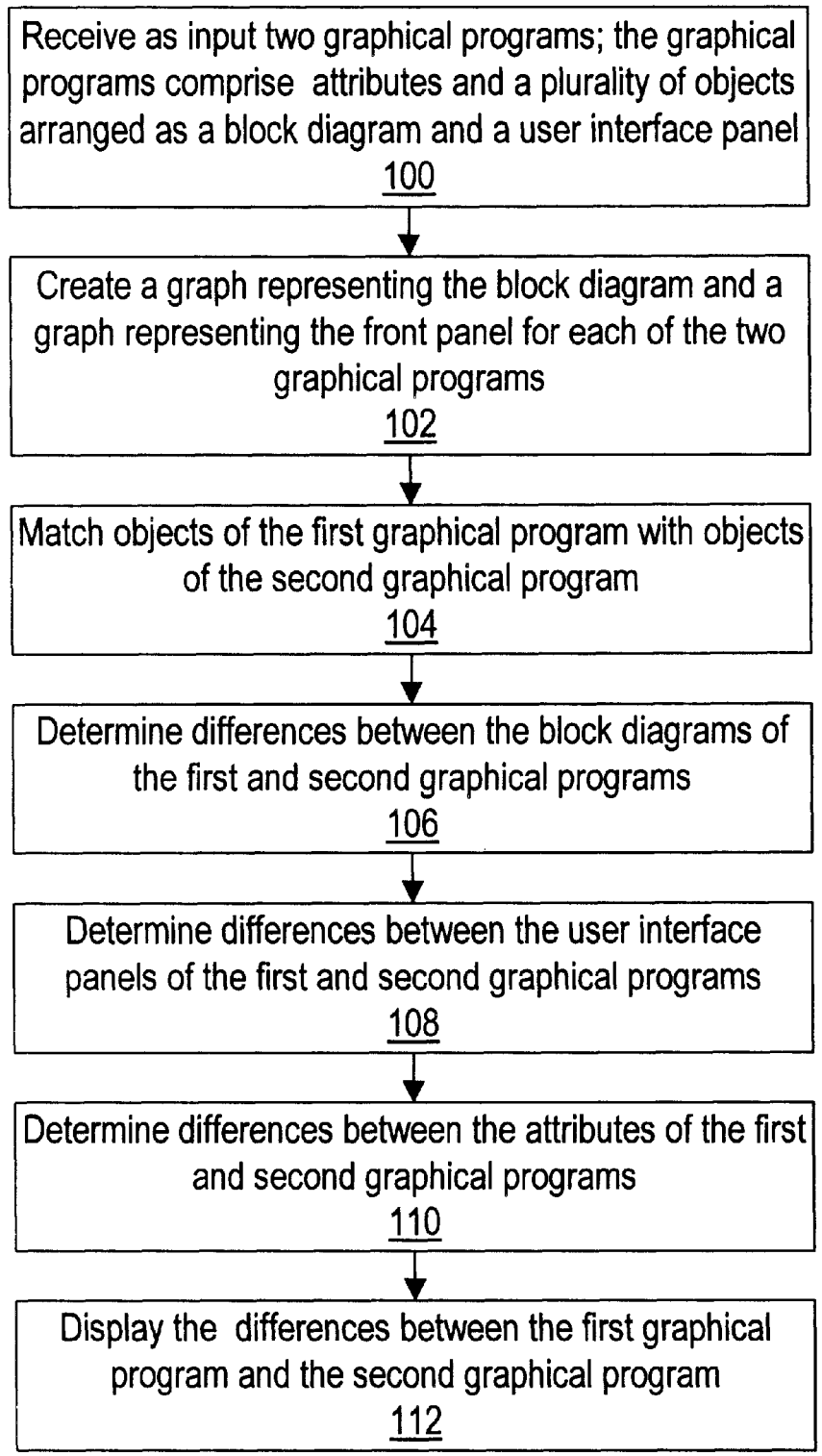
FIG. 3 is a flowchart illustrating the method of detecting differences between graphical programs, such as the graphical program of FIG. 2, according to the present invention.

FIG. 3—High-level Diff Flowchart

Referring now to FIG. 3, a flowchart illustrating the method of detecting differences between graphical programs according to the present invention is shown. Preferably, the method of the present invention is embodied as a software program which executes on a computer system such as computer system 12 of FIG. 1. The software program of the present invention for detecting differences between graphical programs will subsequently be referred to as "diff" for brevity. Appendix A includes a portion of a C language source code listing of one embodiment of diff.

In the preferred embodiment, the graphical programs use graphical data flow programming, such as the LabVIEW graphical programming environment. However, other graphical programming systems may employ the method described herein to detect differences between graphical programs. Examples of systems which may employ the method are Visual Designer from Intelligent Instrumentation, Hewlett-Packard's VEE (Visual Engineering Environment), Snap-Master by HEM Data Corporation, DASYLab by DasyTec, and GFS DiaDem, among others. Programming environments which include graphical programming elements can also use the graphical diff method of the present invention.

Diff receives as input two graphical programs, such as the graphical program of FIG. 2, in step 100. Each of the graphical programs includes a plurality of objects. An object may be defined as having attributes, or properties, and methods according to the notion of objects in the art of object oriented programming. Preferably, an object has an associated icon which visually represents the object, as shown in FIG. 2. Preferably, the graphical program comprises a block diagram portion and a user interface panel portion, and the objects are arranged in these two portions: the block diagram portion and the user interface panel portion. Alternatively, the objects are comprised solely in a block diagram or graphical program portion. In this embodiment, user interface objects, if present, may be comprised in the block diagram portion. A user interface panel is shown in the window in the upper right hand portion of FIG. 2 and a block diagram is shown in the window in the lower left hand portion of FIG. 2. In the case of instrumentation control applications, the user interface panel is typically referred to as an instrument front panel, or front panel. The objects in the user interface panel include controls and indicators. Controls are used to receive input, typically from a user, and to provide the input data to the block diagram. Indicators are used to receive output data from the block diagram and display the output data to the user. Examples of indicators are graphs, thermometers, meters and gauges. Examples of controls are slides, knobs, switches, buttons and dials. In one embodiment, the controls and indicators include clusters of controls and indicators arranged in a hierarchical manner.

Preferably, the user interface panel comprises a directed acyclic graph of objects. In particular, the user interface panel comprises a hierarchical tree structure wherein the nodes of the tree are the user interface panel objects. A graph may be defined as a finite non-empty set of vertices and a set of edges such that every edge connects exactly two vertices. Preferably, any two vertices may be connected by zero or more edges. In the user interface panel, the vertices are the control and indicator objects and the edges are the hierarchical relationship between the objects. The direction of the edges are determined by the level in the hierarchy. That is, the direction is from higher level objects to lower level objects. The connectivity of an object is related to the other objects to which it is connected, i.e., its neighboring objects, and the edges by which it is connected to its neighboring objects.

The block diagram is the portion of the graphical program which includes the graphical code to perform the calculations and operations of the graphical program application. The objects in the block diagram include terminals associated with the front panel controls and indicators. The front panel terminals are used to input and output data between the front panel controls/indicators and the function blocks of the block diagram. The block diagram objects also include function nodes, such as mathematical operators; code execution structures such as for loops, while loops, case statements, and variable references; string functions; file I/O nodes; communication nodes; instrument I/O nodes; and data acquisition nodes, for example. Preferably, the block diagram nodes are connected by data paths, or signals, which determine the flow of data through the block diagram.

In the preferred embodiment, the block diagram comprises a data flow diagram arranged as a directed acyclic graph. The vertices of the graph are the terminals and nodes of the block diagram. The edges of the graph are data path signals which connect the nodes and terminals. The nodes themselves comprise one or more terminals which are connected to the edges. The direction of the edges of the graph is determined by the nodes themselves. For example, if a signal is connected between an output terminal of a first node and an input terminal of a second node, then the direction of data flow on that edge is from the output terminal to the input terminal.

In response to receiving the two graphical programs, diff creates a data structure representing the first block diagram, a data structure representing the second block diagram, a data structure representing the first user interface panel, and a data structure representing the second user interface panel, in step 102. Preferably, the data structures comprise directed graphs, and more particularly, directed acyclic graphs. The graphs are used by diff to determine differences between the block diagrams and user interface panels of the two graphical programs. Step 102 and the graph structure will be discussed in more detail with regard to FIG. 6.

Diff then matches objects in the first graphical program with objects in the second graphical program, in step 104. Objects are matched according to one or more criteria, such as object type, connectivity, attributes and position. Preferably, the matching is performed by calculating a weighted score which indicates a degree of matching or similarity between an object in the first graphical program and an object in the second graphical program according to the one or more criteria to produce matching information. The matching information is used to group the objects into matching subgroups, or sub-graphs, and non-matching sub-graphs for the purpose of determining differences between the two graphical programs. The matching of objects performed in step 104 will be described in more detail with regard to FIG. 8.

Diff then determines differences between the first graphical program and the second graphical program, in steps 106, 108 and 110. Differences are determined for the block diagrams, the user interface panels and the attributes of the first and second graphical programs. The determining of differences includes comparing objects found to match in step 104 to determine any differences between the matching objects. The determining of differences also includes determining objects in the first graphical program which have no match, i.e., which do not exist in the second graphical program. The differences may be functional differences or cosmetic differences. A functional difference is one which may potentially affect the execution of the graphical program. Cosmetic differences are differences which do not affect execution of the graphical program. If the same set of inputs to a graphical program produce the same set of outputs even though a change has been made, that difference is a cosmetic difference rather than a functional difference. The determining of differences in the block diagrams and user interface panels performed in steps 106 and 108, respectively, will be described in more detail below.

Preferably, the graphical program also includes attributes. Examples of graphical program attributes include an icon and connector representing the virtual instrument; attributes related to execution of the graphical program, such as execution priority and whether or not to run the graphical program upon being loaded; attributes related to the visual presentation of the graphical program, such as whether or not to display toolbars and window scroll bars; documentation-related attributes; attributes relating the history of the graphical program; and selection of a run-time menu. Diff detects differences between the attributes of the two graphical programs, in step 110.

Figure 4:
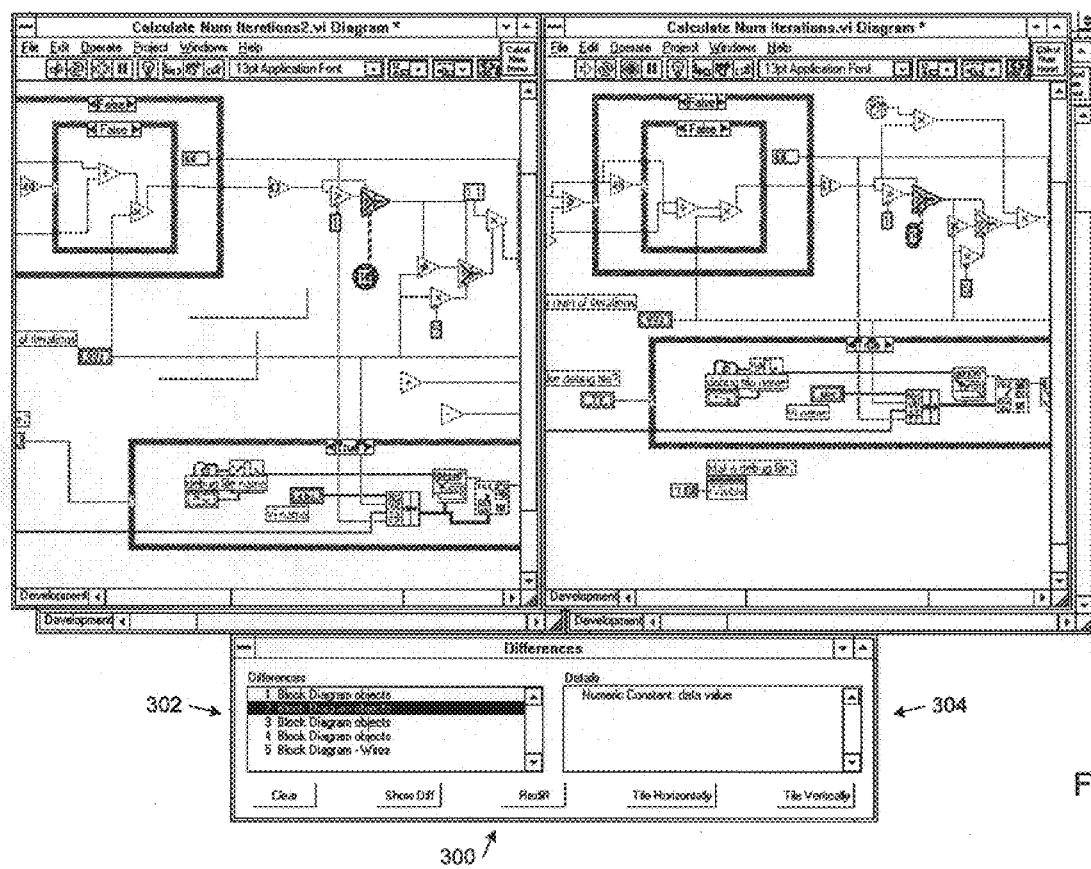
FIG. 4 is a screen shot of the method of the present invention displaying differences between two graphical programs.

Once diff determines the differences between the two graphical programs, diff displays on the display screen of the computer system 12, an indication of the differences, in step 112. In one embodiment, diff highlights differences by drawing a geometric symbol, such as an ellipse or circle, around the differences, as shown in FIG. 4. FIG. 4 shows two versions of a virtual instrument named "Calculate Num Iterations" and "Calculate Num Iterations2". The block diagrams of the two graphical programs are displayed side by side in FIG. 4. One of the differences between the two graphical programs is shown in FIG. 4. The difference is related to a constant node which is connected as an input to a Select node. The block diagram on the left has a constant node with a value attribute of 10, whereas, the block diagram on the right has a constant node with a value attribute of 1. FIG. 4 shows the constant node in each block diagram with an ellipse drawn around them to highlight the difference. It is noted that the portions of the block diagram which are not part of the currently selected difference are "greyed out" so that the difference may be visually highlighted for the user.

In operation of one embodiment, diff also displays the differences in a distinguishing color. For example, a black rectangular background is displayed behind the constant node in the first block diagram for a first period of time (such as two seconds), and then a black rectangular background is displayed behind the constant node in the second block diagram for a similar period of time. This highlights the difference for the user so that the user can visually distinguish the difference.

In operation of another embodiment, diff surrounds the differences with "marching ants". Marching ants refers to the visual movement of alternating colors, such as black and white, around a differing object in each of the graphical programs. This operation may be partially seen in FIG. 4 by virtue of the fact that the constant node and the Select node are circumscribed with an alternating black and white portion thick line. Likewise, the wire connecting the two nodes is highlighted in a similar manner. In operation, the alternating black and white portions "move" visually around the nodes and along the wire to highlight the difference.

Displaying the differences may also include displaying a text description of the differences. FIG. 4 shows a "Differences" window 300 at the bottom portion of the screen. The left portion 302 of the Differences window lists five differences between the two block diagrams shown. The right portion 304 of the Differences window provides a more detailed textual description of the difference highlighted in the left portion and which is currently displayed in the block diagrams, namely, a numeric constant data value. In FIG. 4, the text description reads "Numeric Constant: data value" to indicate that there is a difference between the value of 10 and the value of 1 in the two constant nodes highlighted.

Figure 5:
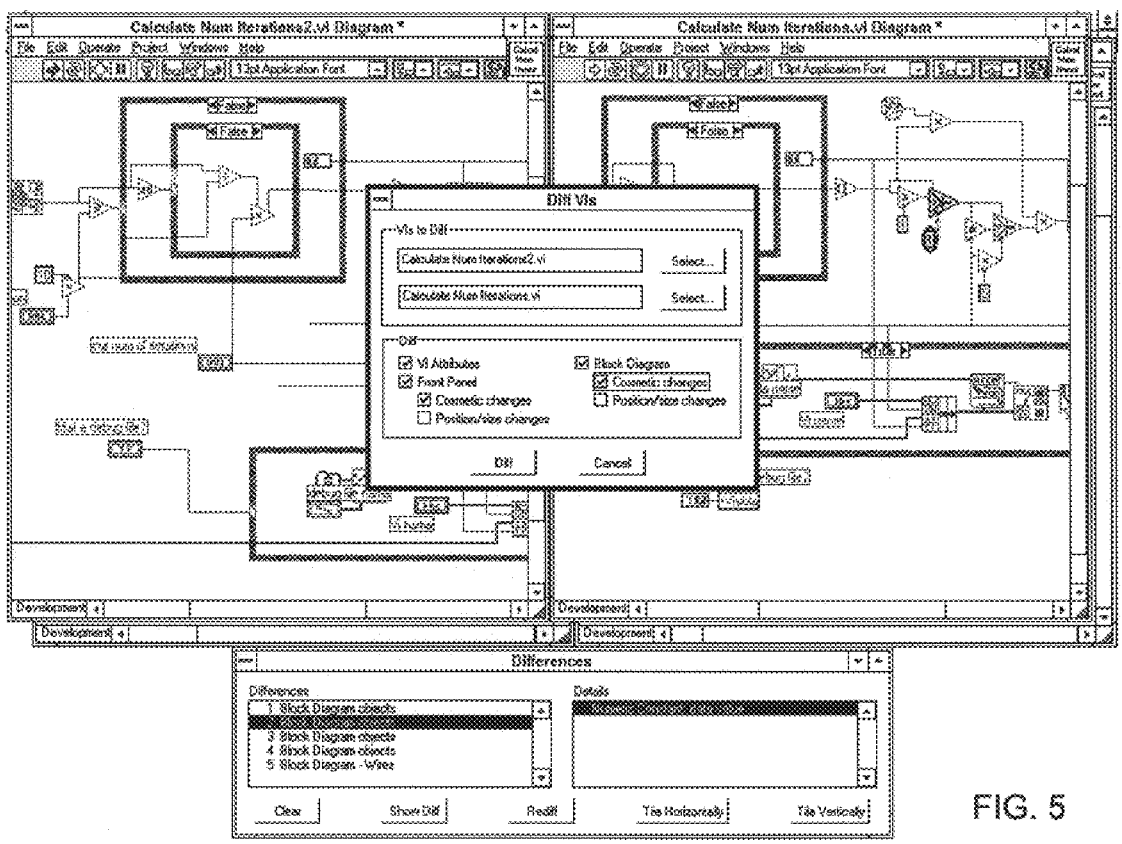
FIG. 5 is a screen shot of a dialog which allows a user to select various options for detecting differences between two graphical programs.

Preferably, differences may be determined in the block diagram, front panel and/or graphical program attributes individually or in any combination thereof, rather than determining the differences in all three. FIG. 5 illustrates a screen shot of a dialog which allows the user to select various diff options.

Figure 6:
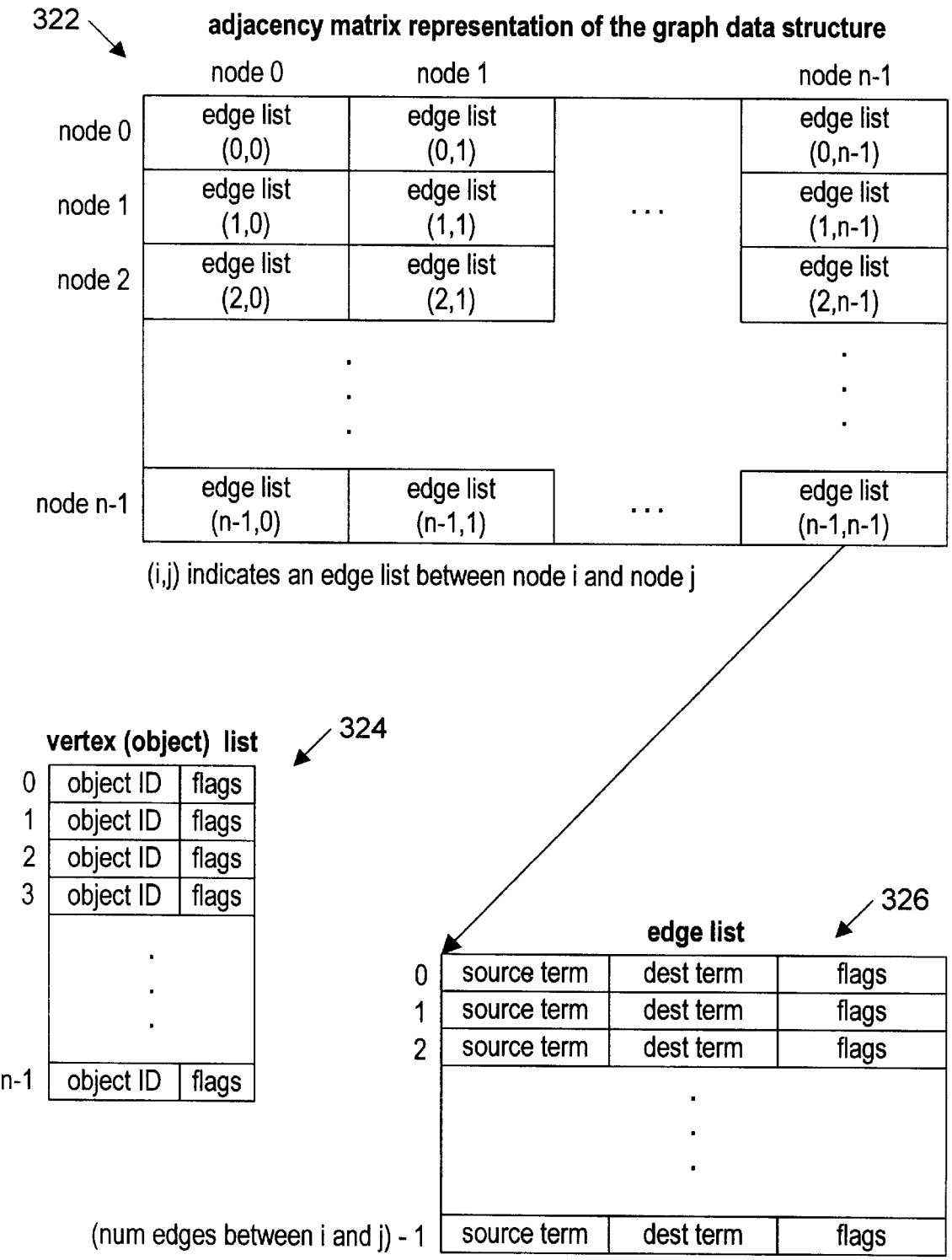
FIG. 6 is a block diagram illustrating a graph data structure according to a preferred embodiment of the present invention.
Figure 7:
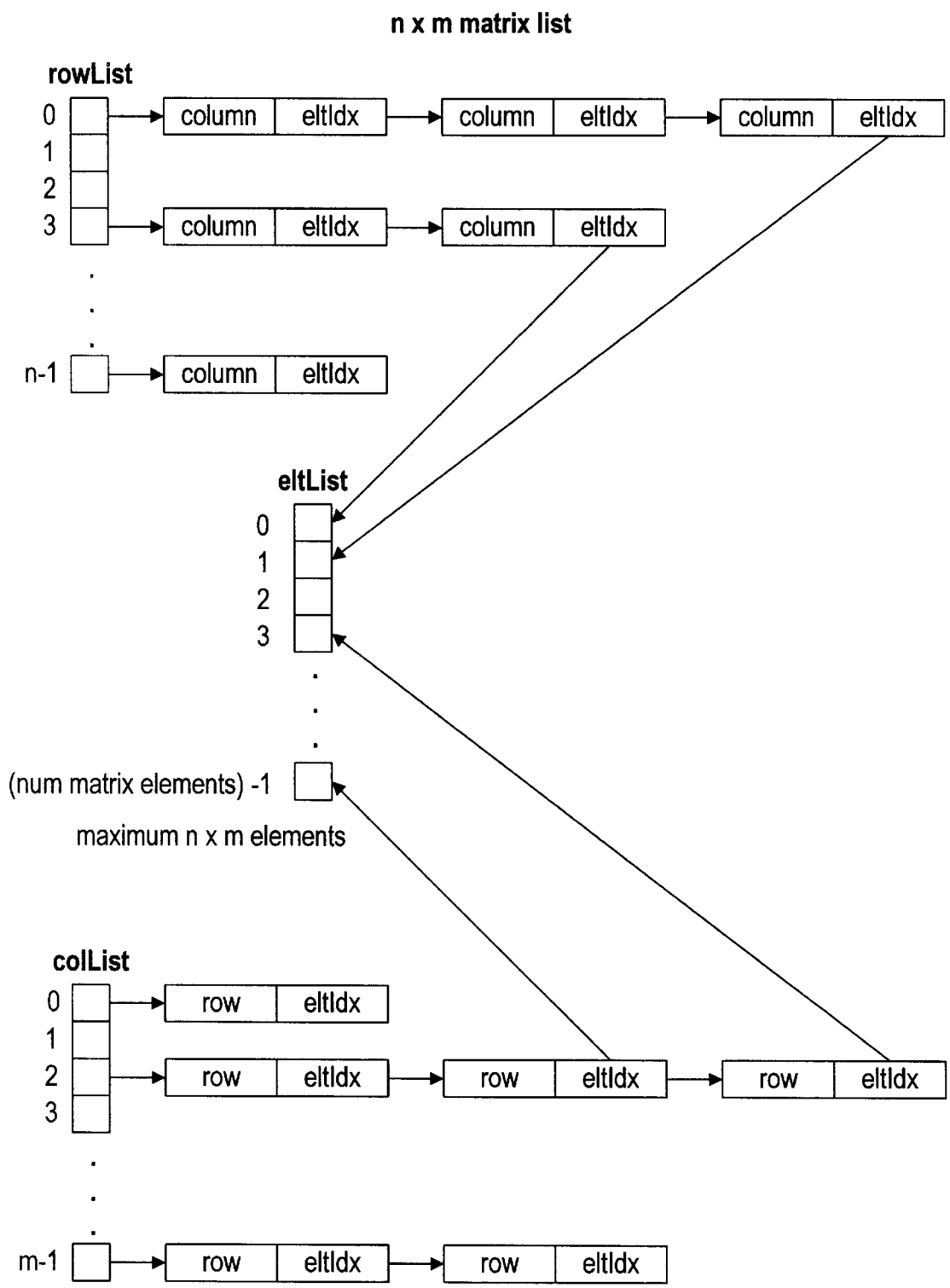
FIG. 7 is a matrix list according to a preferred embodiment for storing an n row by m column matrix.

FIGS. 6 and 7—Data Structures

Referring now to FIG. 6, a block diagram illustrating a graph data structure according to a preferred embodiment is shown. As described above, a graph data structure is created in step 102 to represent each of the block diagram and front panel of each of the two graphical programs. Preferably, a graph structure is a data structure which represents a directed graph. In the case of the block diagram, the vertices of the graph are the user interface panel terminals and the node terminals of the block diagram. The edges of the graph are data path signals which connect the terminals. That is, each edge in the graph includes a source terminal and a destination terminal. The direction of data flow is from the source terminal to the destination terminal.

In the case of the user interface panel, the vertices of the graph are the user interface panel objects, i.e., the controls and indicators. The direction of the edges are determined by the level in the hierarchy. That is, the direction is from higher level objects to lower level objects. The hierarchy of objects in the user interface panel with relation to array and cluster controls and indicators will be described in more detail below with reference to FIG. 11.

The vertices of the graph are stored as a vertex list 324, or object list, as shown. The number of elements in the object list is equal to the number of objects in the graph. Each object list element includes an object ID field and a flags field.

In the preferred embodiment, the graph data structure is represented as an adjacency matrix 322, as shown in FIG. 6. The rows of the matrix correspond to the objects of the graph, i.e., the block diagram or user interface panel. One row exists for each object in the graph. Likewise, the columns of the matrix represent the objects of the graph, one for each object. Thus, a matrix element exists for each ordered pair defined by a row and column (i,j). If an edge exists between the two objects in the ordered pair, then a non-empty edge list 326 exists in the matrix. If no edges exist between the two objects in the ordered pair, then the edge list is empty.

FIG. 6 also illustrates a typical edge list. An element exists in the edge list for each edge between the two objects of the respective row and column. Each element in the edge list comprises a source terminal identifier field, a destination terminal identifier field and a flags field. Data flows along the edge from the source terminal to the destination terminal.

The flags are used in the steps of matching objects and determining differences. The source terminal and destination terminal fields are used to reference the objects in the object list.

The adjacency matrix representation of the graph structure is typically a sparse matrix. That is, typically, a given object is connected to a relatively small number of other objects in the graph. Thus, in a given row, for example, the edge list will be empty for most of the columns. In one embodiment the adjacency matrix is stored as a matrix list. A matrix list embodiment advantageously makes more efficient use of memory storage for relatively sparse, non-trivial graphs than a full matrix representation.

Referring now to FIG. 7, a matrix list according to a preferred embodiment is shown for storing an n×m matrix, i.e., a matrix with n rows and m columns. A matrix list may be used to store a matrix of any dimensions. That is, the matrix list is not limited to representing an n×n matrix, but rather may be used to represent an n×m matrix. The matrix list comprises a rowList, a colList and an eltList, as shown. The eltList, or element list, is a list of the elements of an adjacency matrix. With regard to the graph of FIG. 6, the eltList elements would be the edges in all of the edge lists. The eltList may include a maximum of n×m elements.

The rowList, or row list, comprises an array of list pointers indexed by row number. Each row list element includes a column number and eltIndex, or element index. The column number in the row list element is combined with the row number used to index the row list array to produce an ordered pair corresponding to the (i,j) element in the graph adjacency matrix. The eltIndex is used to index into the eltList array to select the desired matrix element, as shown, such as an edge of the graph of FIG. 6.

Similarly, the colList, or column list, comprises an array of list pointers indexed by column number. Each column list element includes a row number and eltIndex. The row number in the column list element is combined with the column number used to index the column list array to produce an ordered pair corresponding to the (i,j) element in the graph adjacency matrix.

Figure 8:
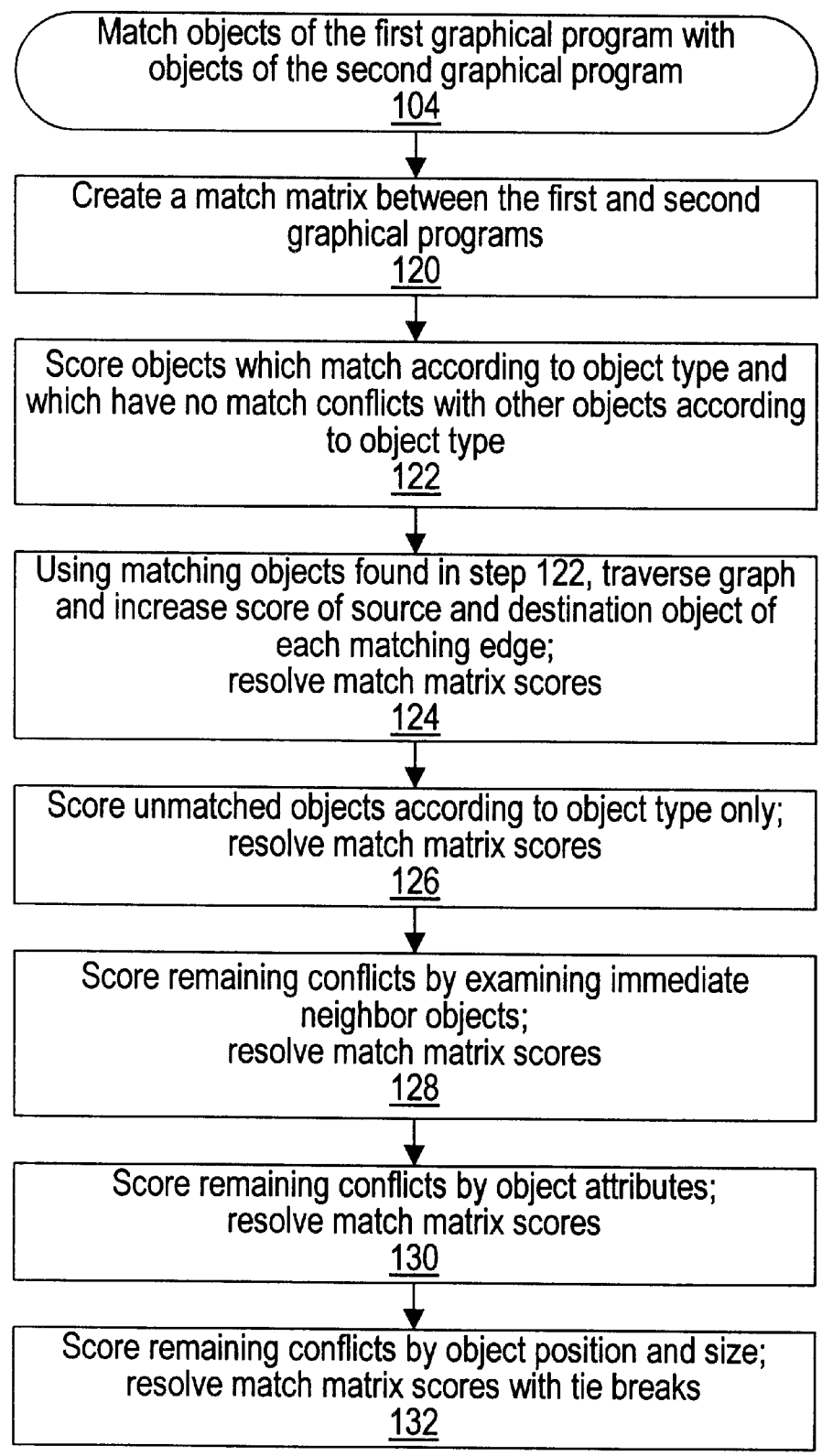
FIG. 8 is a flowchart illustrating in more detail the step of matching objects of two graphical programs from FIG. 3.

FIG. 8—Matching Objects Flowchart

Referring now to FIG. 8, a flowchart illustrating in more detail step 104 from FIG. 3 of matching objects of the two graphical programs is shown. Preferably, step 104, i.e., steps 120 through 132 are performed once for the block diagrams and once for the user interface panels. For brevity, the steps of FIG. 8 will be described with reference to the block diagram. First, diff creates a match matrix to match elements between the first block diagram and the second block diagram, in step 120. The match matrix is used to determine similarities between the two block diagrams so that differences may subsequently be determined. A match matrix is also created to match elements between the first and second user interface panels in step 120. As mentioned, for brevity, the steps of FIG. 8 will be understood to also be performed for the user interface panels as well as the block diagrams, although the steps are described with reference to the block diagrams.

Referring now to FIG. 9, a block diagram illustrating a match matrix according to a preferred embodiment of the present invention is shown. The match matrix comprises a matrix of match information elements. The rows of the match matrix correspond to the objects of the first graphical program and the columns of the match matrix correspond to the objects of the second graphical program. FIG. 9 illustrates a match matrix wherein the first graphical program includes n objects and the second graphical program includes m objects. That is, the match matrix is an n row by m column matrix. Thus, a given match matrix element (i,j) includes matching information regarding an object pair, wherein the objects of the pair are the ith object of the first graphical program and the jth object of the second graphical program.

The match information includes a score field and a flags field. The score field indicates a degree of matching between the two objects of the object pair. The object pairs are scored using a matching heuristic. Objects may match according to various criteria, such as object type and associated conflict in object type, connectivity, neighboring objects, object attributes, position and size. Each of these matching criteria are given a different weight according to the matching heuristic. Scoring of the object pairs will be described in more detail below. The flags field is used in the process of matching objects and determining differences. In the preferred embodiment, the match matrix is embodied as a matrix list as shown in FIG. 7, wherein the elements in the element list are match information elements.

Referring again to FIG. 8, diff calculates scores for object pairs wherein the object type, or object id, of an object in the first graphical program matches the object type of an object in the second graphical program and wherein there are no other objects in the two graphical programs with the same object type, in step 122. For example, if there is only one add node in each of the two graphical programs, then the add nodes match according to object type and are without conflicts. When two objects match according to object type and are without conflicts, diff assigns a relatively large initial score, or weight, to the object pair, thereby effecting a high probability that when the match matrix is resolved, the two objects will be matched.

Using the matching object pairs produced by step 122, diff traverses the graphs of the graphical programs searching for matching edges and increases the score of the source and destination object connected to each matching edge found, in step 124. That is, diff scores the objects by examining the connectivity of the objects. A matching edge is an edge in which both the source and destination objects are elements of matching object pairs according to step 122. According to one embodiment of the matching heuristic, the weight given to objects attached to a matching edge is relatively large.

After scoring the match matrix elements, diff resolves the match matrix where possible. Resolving the match matrix includes recursively traversing the rows of the match matrix, i.e., the objects of the first graphical program, and selecting the element in a given row with the highest score and then setting the score of the other elements in the given row to zero. Thereby, a 1:1 correspondence is produced between the objects in the first and second graphical programs based on the match scores. That is, every object in the first graphical program can contain at most one match with an object in the second graphical program, or alternatively, a row can contain at most one matching column.

A row with all zeroes indicates that the object of the first graphical program corresponding to the row has no matching object in the second graphical program. That is, for some objects a 1:0 correspondence is produced between the objects in the first and second graphical programs based on the match scores. The same process is performed for the columns of the match matrix, i.e., for the second graphical program. At this step in the matching process, if two scores in a given row (or column) are equal, diff does not resolve the row (or column). Instead, the row scores are left intact in hopes that they will be resolved according to a different criteria in a subsequent step. That is, diff does not perform any tie breaks at this point in the matching process.

Next, diff scores unmatched objects according to object type only, in step 126. That is, diff assigns scores to objects which have the same object type. However, in this step 126 the requirement that objects match without conflict is not imposed as in step 122. Preferably, according to step 126, object pairs are assigned a score which is relatively smaller than the score assigned for matches according to step 122 or step 124. That is, the weight attributed to a match based on connectivity and/or non-conflicting object type matches is greater than the weight attributed to a match based solely on object type. After scoring unmatched objects according to object type, diff resolves the match matrix without using tie breaks, in step 126.

Next, diff scores remaining conflicts, i.e., objects which match according to type but which still have conflicts after resolving the matrix according to step 126, by examining immediately neighboring objects of the graph, in step 128. That is, the match score is updated by inspecting each terminal of the objects for matching upstream objects, matching downstream objects, and matching non-connections, i.e., terminals with no signals connected. After scoring remaining conflicts by examining immediate neighbors, diff resolves the match matrix without using tie breaks, in step 128.

Next, diff scores remaining conflicts by object attributes, in step 130. That is, diff invokes a compare engine to compare various attributes of the objects to determines similarities between the objects. The compare engine includes a compare method which has knowledge of each object type in order to distinctly compare the attributes of the objects according to their object types. The compare engine calculates and returns a score indicating the degree of matching or similarity between the two objects being compared. The attributes are grouped, according to the matching heuristic, into functional attributes and cosmetic attributes. Examples of functional object attributes are terminal data types and constant data values. Examples of cosmetic attributes are the position, size, color, visibility, name, etc. of objects. A functional attribute is one which may potentially affect the execution of the graphical program. Cosmetic attributes are attributes which do not affect execution of the graphical program. If the same set of inputs to a graphical program produce the same set of outputs even though an attribute has been changed, that attribute is a cosmetic attribute rather than a functional attribute. Preferably, functional attributes have greater weight than cosmetic attributes. Furthermore, match scores based on examination of attributes have less weight than matches based on connectivity or matches by object type without conflicts. After scoring by object attributes, diff resolves the match matrix without using tie breaks, in step 130.

Next, diff scores remaining conflicts by object position and size, in step 132. That is, diff compares the position and size of the objects to determines similarities between the objects. The more similar the position and/or size of two objects the greater the match score assigned to them. After scoring by object position and size, diff resolves the match matrix using tie breaks, in step 132. That is, in step 132 diff resolves all conflicts. Preferably, tie breaks in match scores are resolved on a "first-come-first serve" basis, i.e., as the match matrix is traversed, the first score encountered among equal scores wins the tie.

Figure 10:
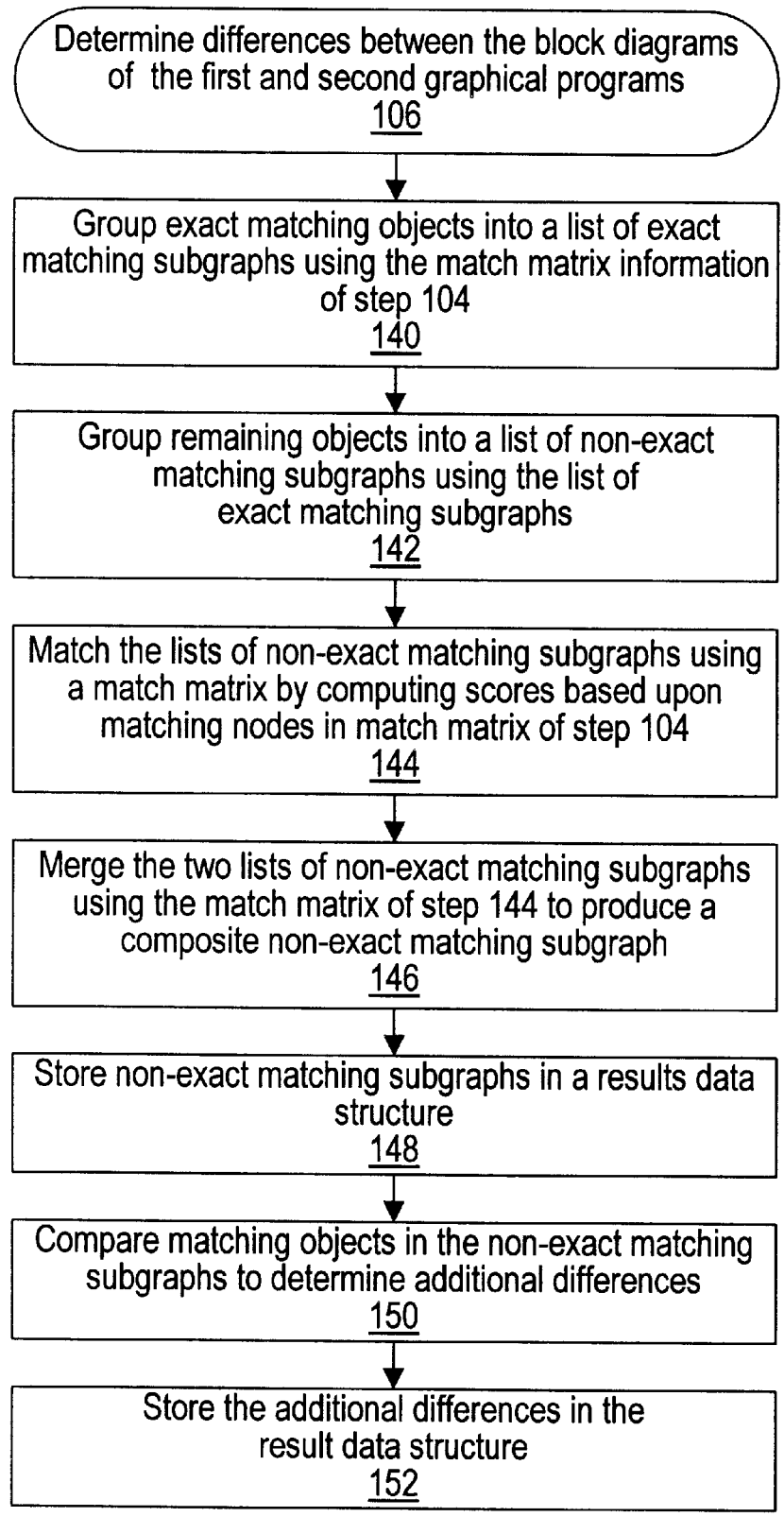
FIG. 10 is a flowchart illustrating in more detail the step of determining differences between block diagrams of two graphical programs of FIG. 3.

FIG. 10—Determining Differences in Block Diagrams Flowchart

Referring now to FIG. 10, a flowchart illustrating in more detail step 106 of determining differences between the block diagrams of two graphical programs is shown. In step 140, diff groups exact matching objects into a list of exact matching subgraphs using the match information of the match matrix created according to step 104 and employing the compare engine. In an exact match the two objects: 1) have the same object type and their attributes compare exactly according to the compare engine; and, 2) have connectivity matches. The compare engine includes a compare method which has knowledge of each object type in order to distinctly compare the attributes of the objects according to their object types. The compare engine returns a predetermined value if the two objects being compared compare exactly. In a connectivity match all connections, or edges, of the objects match. That is, all objects to which the prospective exact matching objects are connected are also matching objects. The exact matching subgraphs comprise exact matching objects which are connected together. The exact matching subgraphs are also referred to as exact matching connected components.

Diff simultaneously traverses both graphs representing the block diagrams to produce the list of exact matching subgraphs. While traversing the graphs to find exact matching subgraphs, each edge belonging to a matched object is marked in the flags field of the corresponding element in the adjacency matrix data structure to denote that the edge belongs to a matched object. Matching objects which have all of their edges marked in the corresponding adjacency matrix element in both graphs are marked in the flags field of the object list (shown in FIG. 6) element corresponding to the matching object.

Next, diff groups the remaining objects, i.e., the objects which were not grouped into the exact matching subgraphs, into a list of non-exact matching subgraphs, one for each block diagram, using the match matrix and list of exact matching subgraphs, in step 142. These two lists of non-exact matching subgraphs are then matched together in a match matrix, in step 144. This match matrix is a different match matrix from the one produced in step 104, and will be referred to herein as the subgraph match matrix. The subgraph match matrix is similar to the match matrix shown in FIG. 9 except that the rows correspond to the subgraphs in the list of non-exact matching subgraphs of the first block diagram and the columns correspond to the subgraphs in the list of non-exact matching subgraphs of the second block diagram. The scores of the subgraph match matrix indicate a degree of matching or similarity between a subgraph in the first block diagram and a subgraph in the second block diagram. Objects in the non-exact matching subgraphs which match according to the match matrix of step 104, are referred to as anchor nodes. The anchor nodes are used to calculate the match scores in the subgraph match matrix.

Using the matching information in the subgraph match matrix, diff merges the two lists of non-exact matching subgraphs into a composite non-exact matching subgraph, in step 146. The merging is performed such that transitive connections, i.e., non-direct connections, are taken into account when creating the composite non-exact matching subgraph. The non-exact matching subgraphs are then stored in a results data structure in step 148 so that the non-exact matching subgraph differences may be subsequently displayed to the user in step 112. Remaining non-exact matching subgraphs are paired with empty graphs and are considered as new subgraphs that have been added to or removed from the second block diagram. The remaining non-exact matching subgraphs paired with empty graphs are also stored in the results data structure so that they may be subsequently displayed to the user in step 112.

Once the exact matching and non-exact matching subgraphs have been created, diff compares matching objects in the non-exact matching subgraphs to determine additional differences in the objects of the non-exact matching subgraphs, in step 150. The additional differences are stored in the results data structure, in step 152. The compare engine is employed to compare the matching objects. The compare engine includes a compare method which has knowledge of each object type in order to distinctly compare each attribute of the object. The compare engine produces a textual description of the differences between two objects. This textual description is displayed for the user in step 112, as described above.

The differences found by the compare engine may be functional differences or cosmetic differences. A functional difference is one which may potentially affect the execution of the graphical program. Cosmetic differences are differences which do not affect execution of the graphical program. If the same set of inputs to a graphical program produce the same set of outputs even though a change has been made, that difference is a cosmetic difference rather than a functional difference.

Figure 11:
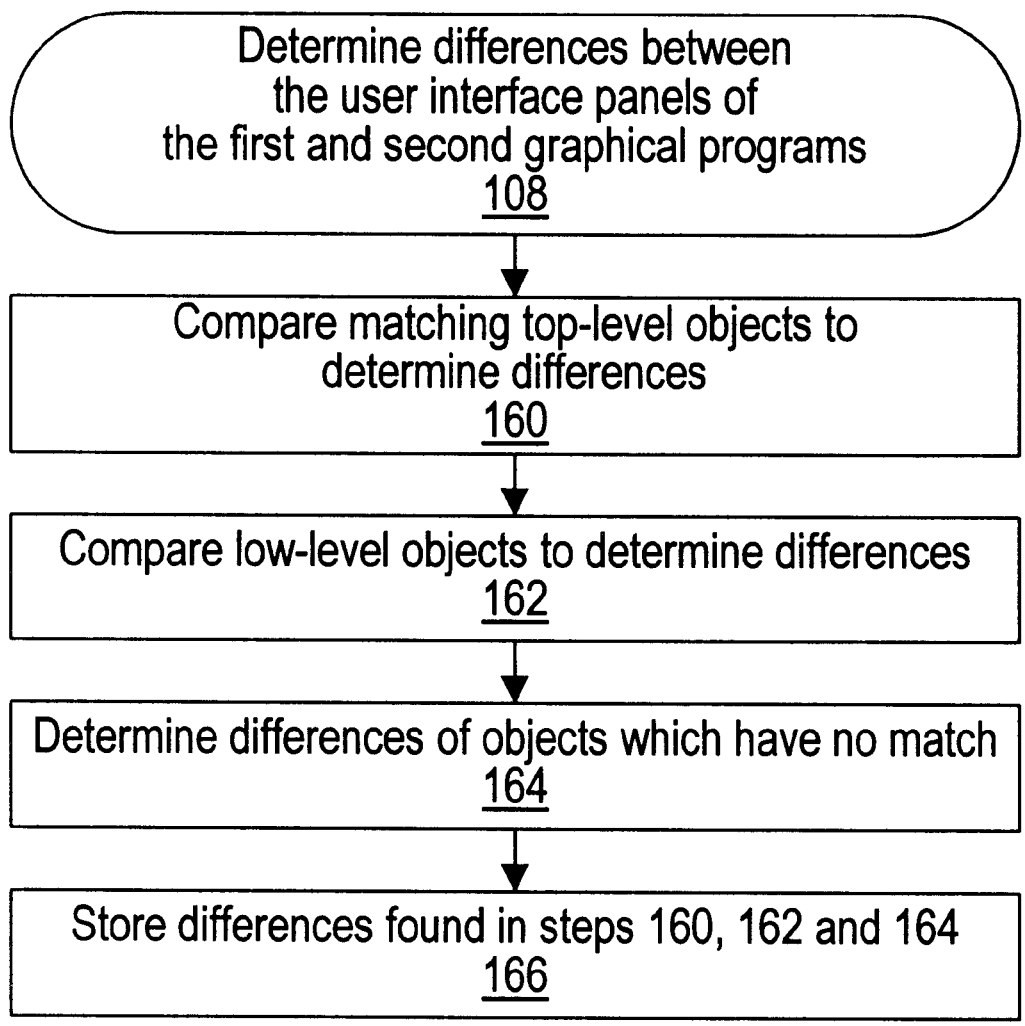
FIG. 11 is a flowchart illustrating in more detail the step of determining differences between the user interface panels of two graphical programs of FIG. 3.

FIG. 11—Determining Differences in User Interface Panels Flowchart

Referring now to FIG. 11, a flowchart illustrating in more detail step 108 of determining differences between the user interface panels of the two graphical programs is shown. In one embodiment, user interface panel controls and indicators may include arrays and/or clusters. In one embodiment, an array is a variable-sized collection of data elements of the same type. In one embodiment, a cluster is a fixed-sized collection of data elements of mixed types. The clusters are aggregations and/or child-parent relationships of data elements, similar to a record or structure in high-level programming languages. Clusters may include a hierarchy of objects, which include other clusters, controls, and/or indicators. Thus, a cluster may include top-level objects and low-level objects in the hierarchy of objects. As described above, in step 102, diff creates a graph for each user interface panel wherein the objects of the user interface panel are the vertices or nodes in the graph and the edges of the graph represent the hierarchical relationship between the user interface panel elements, and in particular arrays and clusters.

As described above, in step 104 a match matrix including matching information is created which is resolved to produce a 1:1 or 1:0 matching relationship between objects of the first and second graphical programs. A resolved match matrix is produced for the block diagrams and a resolved match matrix is produced for the user interface panels according to steps 120 through 132.

For top-level user interface panel objects which match in the match matrix, diff invokes the compare engine to compare the matching objects in order to determine differences between the top-level objects, in step 160.

Next, diff provides matching information to the compare engine to compare the low-level objects (e.g., individual cluster elements) of the top-level objects in order to determine differences between the low-level objects of the user interface panels, in step 162.

Then, diff determines which objects of the user interface panels have no match, in step 164. This occurs when the user has added or deleted an object between the first user interface panel and the second user interface panel. Objects which have no match are identified as those which have a 1:0 relationship in the user interface panel match matrix. The differences found in steps 160 through 164 are stored, in step 166, so that the differences may be displayed in step 112.

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

I claim:

1. A computer-implemented method for detecting differences between first and second graphical programs, wherein the method executes on a computer including a display, the method comprising:

determining differences between said first graphical program and said second graphical program, wherein said first graphical program and said second gaphical program each comprise graphical code; and displaying an indication of said differences on the display;

wherein said differences are used to evaluate at least one of the first graphical program and the second graphical program.

2. The method of claim 1, wherein said first and second graphical programs each comprise a block diagram which includes interconnected function icons.

3. The method of claim 1, wherein said first and second graphical programs each include a user interface panel which displays data.

4. The method of claim 1, wherein said first graphical program includes a first user interface panel for viewing at least one of input to or output from the first graphical program;

wherein said second graphical program includes a second user interface panel for viewing at least one of input to or output from the second graphical program.

5. The method of claim 1, wherein said displaying said differences includes displaying a textual description of each of said differences.

6. The method of claim 1, wherein said displaying said differences comprises displaying at least one of said first and second graphical programs, wherein said displaying said differences further comprises highlighting at least a subset of said differences between said first and second graphical programs.

7. The method of claim 1, wherein said determining differences between said first graphical program and said second graphical program includes comparing differences between attributes of said first graphical program and attributes of said second graphical program.

8. The method of claim 1, wherein said first and second graphical programs each comprise a block diagram comprising graphical code, a user interface panel for displaying one or more of data output from the block diagram and data input to the block diagram, and graphical program attributes;

wherein said determining differences between said first graphical program and said second graphical program comprises:

determining differences between said block diagrams of said first and second graphical programs;

determining differences between said user interface panels of said first and second graphical programs;

determining differences between said graphical program attributes of said first and second graphical programs.

9. The method of claim 1, wherein said determining differences between said first and second graphical programs comprises finding functional differences between said first graphical program and said second graphical program, wherein a functional difference indicates a potential difference in execution of said first and second graphical programs.

10. The method of claim 9, wherein said determining differences between said first and second graphical programs includes finding cosmetic differences between said first and second graphical programs, wherein a cosmetic difference is a non-functional difference.

11. The method of claim 1, wherein the first graphical program comprises a first plurality of objects and wherein the second graphical program comprises a second plurality of objects;

wherein said determining differences includes determining differences between said first plurality of objects of said first graphical program and said second plurality of objects of said second graphical program.

12. The method of claim 11, wherein said objects include function block icons.

13. The method of claim 11, wherein said objects include controls and indicators.

14. The method of claim 11, wherein said objects include functions block icons; and wherein said objects also include data flow paths coupled between said functions block icons.

15. The method of claim 11, wherein said determining differences includes matching said first plurality of objects of said first graphical program with said second plurality of objects of said second graphical program.

16. The method of claim 15, further comprising:

creating data structures to represent said first and second graphical programs, wherein said matching uses said data structures.

17. The method of claim 15, wherein said matching includes determining matches between one or more of said first plurality of objects of said first graphical program with one or more of said second plurality of objects of said second graphical program.

18. The method of claim 17, wherein said matching comprises determining objects of said first graphical program which have a same type as objects of said second graphical program.

19. The method of claim 18, wherein said matching further comprises determining if an object of said first graphical program which has the same type as an object of said second graphical program has the same type as another object in said second graphical program.

20. The method of claim 15, wherein said determining differences includes determining objects present in said first graphical program which have no matching object in said second graphical program.

21. The method of claim 15, wherein said determining differences includes comparing matching objects in said first graphical program and said second graphical program to determine differences in said matching objects.

22. The method of claim 21, wherein each of said first plurality of objects and said second plurality of objects comprises a set of attributes and methods, wherein said comparing matching objects includes comparing attributes of said matching objects in said first graphical program and said second graphical program.

23. The method of claim 15, wherein, for each respective object in said first graphical program, said matching comprises:

comparing the respective object in said first graphical program with one or more objects in said second graphical program;

determining a score value for a plurality of object pairs in response to said comparing, wherein each of said plurality of object pairs comprises two object elements, said two object elements comprising said respective object in said first graphical program and an object of said one or more objects in said second graphical program, wherein said score value indicates a degree of matching between said object elements comprising said object pair.

24. The method of claim 23, wherein said determining said score value for one of said plurality of object pairs includes examining connectivity of object elements comprising said object pair.

25. The method of claim 23, wherein said determining said score value for one of said plurality of object pairs includes examining attributes of object elements comprising said object pair.

26. The method of claim 23, wherein said score value is a weighted score value, wherein said determining said score value for one of said plurality of object pairs includes examining connectivity of object elements comprising said object pair and examining attributes of object elements comprising said object pair;
wherein said connectivity of object elements has greater weight than said attributes of said object elements.

27. The method of claim 26, wherein said attributes comprise functional attributes and cosmetic attributes;
wherein said functional attributes have greater weight than said cosmetic attributes.

28. The method of claim 23, wherein said matching further comprises:
storing said score values in a match matrix, wherein said match matrix comprises rows which correspond to said first plurality of objects in said first graphical program, and wherein said match matrix comprises columns which correspond to said second plurality of objects in said second graphical program;
wherein for an ith row and a jth column, the matrix element (i,j) includes the score value for the object pair comprising object i and object j.

29. The method of claim 28, wherein said matching further comprises:
resolving said match matrix using said match matrix score values, wherein said resolving produces a 1:1 or 1:0 relationship between objects in said first graphical program and objects in said second graphical program depending upon whether or not an object in said first graphical program has a matching object in said second graphical program.

30. The method of claim 28, wherein said matching further comprises:
resolving said match matrix using said match matrix score values, wherein, for each of at least a subset of said rows corresponding to said first plurality of objects, said resolving produces a column from said second plurality of objects in said second graphical program, wherein said produced column has a match matrix element with a highest score value for the respective row.

31. The method of claim 15,
wherein said matching produces a resolved match matrix, wherein said resolved match matrix comprises matching information regarding matches between said first plurality of objects in said first graphical program and said second plurality of objects in said second graphical program;
wherein said determining differences between said first graphical program and said second graphical program comprises:

grouping objects which have exact matches with connectivity matches into exact matching connected components using said matching information;
grouping remaining objects to produce non-exact matching connected components wherein said grouping remaining objects produces a first list of non-exact-matching connected components and produces a second list of non-matching connected components;
matching said first and second lists of non-exact matching connected components, wherein said matching said first and second lists of non-exact matching connected components includes finding common objects in said first and second lists of non-exact matching connected components, wherein said matching said first and second lists of non-exact matching connected components produces second matching information;
merging said first and second lists of non-exact matching connected components using said second matching information, wherein said merging produces a composite non-exact matching connected component list;
storing corresponding non-exact matching connected components in a result data structure;
comparing matching objects in corresponding non-exact matching connected components to determine additional object differences;
storing said additional object differences in said result data structure.

32. The method of claim 31, wherein said grouping objects which have exact matches with connectivity matches comprises grouping objects which have exact matches with connectivity matches using said matching information to produce a first list of exact matching connected components and to produce a second list of exact matching connected components, wherein said grouping objects includes comparing objects according to one or more criteria to determine exact matches between objects, wherein an exact match comprises a match in the match matrix and match in said comparing.

33. The method of claim 15,
wherein said first graphical program comprises a first user interface panel including a subset of said first plurality of objects;
wherein said second graphical program comprises a second user interface panel including a subset of said second plurality of objects;
wherein said matching produces a user interface panel match matrix comprising matching information;
wherein said determining differences includes determining differences between said first user interface panel and said second user interface panel which comprises:
comparing matching top-level objects of said first and second user interface panels to determine differences between said top-level objects using said matching information;
comparing low-level objects of said top-level objects to determine differences between said low-level objects using said matching information;
storing said differences in response to said comparing matching top-level objects of said first and second user interface panels and said comparing low-level objects of said top-level objects.

34. The method of claim 11, further comprising:
creating one or more data structures which includes information regarding said first plurality of objects in said first graphical program and said second plurality of objects in said second graphical program;

wherein said determining differences uses said one or more data structures.

35. The method of claim 34, wherein said one or more data structures each comprise directed graphs comprising a plurality of vertices connected by edges, wherein each of said vertices represents one of said objects in a respective one of said graphical programs.

36. The method of claim 1, wherein said differences are useable in determining differences between the first graphical program and the second graphical program.

37. The method of claim 1, wherein said differences are useable in determining errors in at least one of the first graphical program and the second graphical program.

38. The method of claim 1, wherein said differences are useable in eliminating errors in at least one of the first graphical program and the second graphical program.

39. The method of claim 1, further comprising:

modifying at least one of the first graphical program and the second graphical program to eliminate errors in at least one of the first graphical program and the second graphical program, wherein said modifying is performed in response to said differences.

40. The method of claim 1, wherein the first graphical program comprises interconnected graphical objects which specify operation of the first graphical program, and wherein the second graphical program comprises interconnected graphical objects which specify operation of the second graphical program.

41. The method of claim 1, wherein the first graphical program comprises interconnected icons which specify operation of the first graphical program, and wherein the second graphical program comprises interconnected icons which specify operation of the second graphical program.

42. A computer-implemented method for detecting differences between first and second graphical programs, wherein the method executes on a computer including a display, the method comprising:

creating the first graphical program, wherein the first graphical program comprises first graphical code;

creating the second graphical program, wherein the second graphical program comprises second graphical code;

determining differences between said first graphical program and said second graphical program; and displaying an indication of said differences on the display;

wherein said differences are used to evaluate at least one of the first graphical program and the second graphical program.

43. The method of claim 42, wherein the first graphical program comprises a first plurality of objects;

wherein the second graphical program comprises a second plurality of objects;

wherein said determining differences comprises determining differences between said first plurality of objects in said first graphical program and said second plurality of objects in said second graphical program.

44. The method of claim 42, wherein said graphical code includes function block icons.

45. The method of claim 42, wherein said graphical code includes interconnected function block icons.

46. The method of claim 42, wherein said creating the second graphical program comprises modifying the first graphical program to create the second graphical program.

47. A computer-implemented method for detecting differences between first and second graphical programs, wherein the method executes on a computer including a display, the method comprising:

creating the first graphical program, wherein the first graphical program comprises first graphical code, wherein the first graphical program comprises a first plurality of objects;

creating the second graphical program, wherein the second graphical program comprises second graphical code, wherein the second graphical program comprises a second plurality of objects;

determining differences between said first plurality of objects in said first graphical program and said second plurality of objects in said second graphical program; and displaying an indication of said differences on the display;

wherein said differences are used to evaluate at least one of the first graphical program and the second graphical program.

48. A computer-implemented method for detecting differences between first and second graphical programs, wherein the method executes on a computer including a display, the method comprising:

creating the first graphical program, wherein the first graphical program comprises first graphical code, wherein the first graphical program comprises a first plurality of objects;

creating the second graphical program, wherein the second graphical program comprises second graphical code, wherein the second graphical program comprises a second plurality of objects;

matching said first plurality of objects of said first graphical program with said second plurality of objects of said second graphical program;

determining differences between said first graphical program and said second graphical program in response to said matching; and displaying an indication of said differences on the display;

wherein said differences are used to evaluate at least one of the first graphical program and the second graphical program.

49. A computer-implemented method for detecting differences between first and second graphical programs, wherein the method executes on a computer including a display, wherein the first and second graphical programs comprise graphical code, wherein the first graphical program comprises a first plurality of objects and wherein the second graphical program comprises a second plurality of objects, the method comprising:

matching said first plurality of objects of said first graphical program with said second plurality of objects of said second graphical program;

determining differences between said first graphical program and said second graphical program in response to said matching; and displaying an indication of said differences on the display screen;

wherein said differences are used to evaluate at least one of the first graphical program and the second graphical program.

50. A computer system for detecting differences between first and second graphical programs, comprising:
- a central processing unit (CPU);
- a display coupled to the CPU; and
- a memory medium coupled to the CPU which stores said first and second graphical programs, wherein each of the said first and second graphical programs comprises graphical code, wherein the memory medium also stores a difference program for detecting differences between said first and second graphical programs;
- wherein said CPU is operable to execute said difference program to determine differences between said first graphical program and said second graphical program and to display an indication of said differences on the display;
- wherein said differences are used to evaluate at least one of the first graphical program and the second graphical program.

51. The computer system of claim 50, wherein the first graphical program comprises a first plurality of objects and wherein the second graphical program comprises a second plurality of objects;
- wherein said CPU is operable to match said first plurality of objects of said first graphical program with said second plurality of objects of said second graphical program to determine differences between said first graphical program and said second graphical program.

52. The computer system of claim 51, wherein said objects include function block icons.

53. The computer system of claim 51, wherein said objects include controls and indicators for displaying data.

54. The computer system of claim 51,
- wherein said objects include function block icons; and
- wherein said objects also include data flow paths coupled between said function block icons.

55. The computer system of claim 50, wherein, to display an indication of said differences on the display, the CPU is operable to display at least one of said first and second graphical programs and highlight at least a subset of said differences between said first and second graphical programs.

56. A computer system for detecting differences between first and second graphical programs, comprising:
- a central processing unit (CPU);
- a display coupled to the CPU; and
- a memory medium coupled to the CPU which stores said first and second graphical programs, wherein each of the said first and second graphical programs comprises graphical code, wherein the first graphical program comprises a first plurality of objects and wherein the second graphical program comprises a second plurality of objects, wherein the memory medium also stores a difference program for detecting differences between said first and second graphical programs;
- wherein said CPU is operable to execute said difference program to:
  - match said first plurality of objects of said first graphical program with said second plurality of objects of said second graphical program;
  - determine differences between said first graphical program and said second graphical program in response to the matching; and
  - display an indication of said differences on the display;
- wherein said differences are used to evaluate at least one of the first graphical program and the second graphical program.

57. A computer-readable memory medium comprising program instructions for detecting differences between first and second graphical programs, wherein the program instructions execute on a computer including a display, wherein the program instructions are executable to implement:
- determining differences between said first graphical program and said second graphical program, wherein said first graphical program and said second gaphical program each comprise graphical code; and
- displaying an indication of said differences on the display;
- wherein said differences are used to evaluate at least one of the first graphical program and the second graphical program.

58. The memory medium of claim 57, wherein the first graphical program comprises a first plurality of objects and wherein the second graphical program comprises a second plurality of objects;
- wherein said determining differences includes determining differences between said first plurality of objects of said first graphical program and said second plurality of objects of said second graphical program.

59. The memory medium of claim 58, wherein said objects include function block icons.

60. The memory medium of claim 58, wherein said objects include controls and indicators.

61. The memory medium of claim 58,
- wherein said objects include functions block icons; and
- wherein said objects also include data flow paths coupled between said function block icons.

62. The memory medium of claim 57, wherein said first and second graphical programs each comprise a block diagram which includes interconnected function icons.

63. The memory medium of claim 57, wherein said first and second graphical programs each include a user interface panel which displays data.

64. The memory medium of claim 57, wherein said displaying said differences includes displaying a textual description of each of said differences.

65. The memory medium of claim 57, wherein said displaying said differences comprises displaying at least one of said first and second graphical programs, wherein said displaying said differences further comprises highlighting at least a subset of said differences between said first and second graphical programs.

66. The memory medium of claim 57, wherein said determining differences between said first graphical program and said second graphical program includes comparing differences between attributes of said first graphical program and attributes of said second graphical program.

67. The memory medium of claim 57, wherein said first and second graphical programs each comprise a block diagram comprising graphical code, a user interface panel for displaying one or more of data output from the block diagram and data input to the block diagram, and graphical program attributes;
- wherein said determining differences between said first graphical program and said second graphical program comprises:
  - determining differences between said block diagrams of said first and second graphical programs;
  - determining differences between said user interface panels of said first and second graphical programs;
  - determining differences between said graphical program attributes of said first and second graphical programs.

68. The memory medium of claim 57, wherein said determining differences between said first and second graphical programs comprises finding functional differences between said first graphical program and said second graphical program, wherein a functional difference indicates a potential difference in execution of said first and second graphical programs.

69. The memory medium of claim 68, wherein said determining differences between said first and second graphical programs includes finding cosmetic differences between said first and second graphical programs, wherein a cosmetic difference is a non-functional difference.

70. The memory medium of claim 57, wherein the first graphical program comprises a first plurality of objects and wherein the second graphical program comprises a second plurality of objects;
wherein said determining differences includes matching said first plurality of objects of said first graphical program with said second plurality of objects of said second graphical program.

71. The memory medium of claim 70, wherein said matching includes determining matches between one or more of said first plurality of objects of said first graphical program with one or more of said second plurality of objects of said second graphical program.

72. The memory medium of claim 71, wherein said matching comprises determining objects of said first graphical program which have a same type as objects of said second graphical program.

73. The memory medium of claim 72, wherein said matching further comprises determining if an object of said first graphical program which has the same type as an object of said second graphical program has the same type as another object in said second graphical program.

74. The memory medium of claim 70, wherein said determining differences includes determining objects present in said first graphical program which have no matching object in said second graphical program.

75. The memory medium of claim 70, wherein said determining differences includes comparing matching objects in said first graphical program and said second graphical program to determine differences in said matching objects.

76. The memory medium of claim 75, wherein each of said objects comprises a set of attributes and methods, wherein said comparing matching objects includes comparing attributes of said matching objects in said first graphical program and said second graphical program.

77. The memory medium of claim 70, wherein said first and second graphical programs each comprise a block diagram comprising graphical code, a user interface panel for displaying one or more of data output from the block diagram and data input to the block diagram, and graphical program attributes;
wherein said determining differences between said first graphical program and said second graphical program comprises:
determining differences between said block diagrams of said first and second graphical programs;
determining differences between said user interface panels of said first and second graphical programs;
determining differences between said graphical program attributes of said first and second graphical programs.

78. The memory medium of claim 70, wherein, for each respective object in said first graphical program, said matching comprises:
comparing the respective object in said first graphical program with one or more objects in said second graphical program;
determining a score value for a plurality of object pairs in response to said comparing, wherein each of said plurality of object pairs comprises two object elements, said two object elements comprising said respective object in said first graphical program and an object of said one or more objects in said second graphical program, wherein said score value indicates a degree of matching between said object elements comprising said object pair.

79. The memory medium of claim 78, wherein said determining said score value for one of said plurality of object pairs includes examining connectivity of object elements comprising said object pair.

80. The memory medium of claim 78, wherein said determining said score value for one of said plurality of object pairs includes examining attributes of object elements comprising said object pair.

81. The memory medium of claim 78, wherein said score value is a weighted score value, wherein said determining said score value for one of said plurality of object pairs includes examining connectivity of object elements comprising said object pair and examining attributes of object elements comprising said object pair;
wherein said connectivity of object elements has greater weight than said attributes of said object elements.

82. The memory medium of claim 81, wherein said attributes comprise functional attributes and cosmetic attributes;
wherein said functional attributes have greater weight than said cosmetic attributes.

83. The memory medium of claim 78, wherein said matching further comprises:
storing said score values in a match matrix, wherein said match matrix comprises rows which correspond to said first plurality of objects in said first graphical program, and wherein said match matrix comprises columns which correspond to said second plurality of objects in said second graphical program;
wherein for an ith row and a jth column, the matrix element (i,j) includes the score value for the object pair comprising object i and object j.

84. The memory medium of claim 83, wherein said matching further comprises:
resolving said match matrix using said match matrix score values, wherein said resolving produces a 1:1 or 1:0 relationship between objects in said first graphical program and objects in said second graphical program depending upon whether or not an object in said first graphical program has a matching object in said second graphical program.

85. The memory medium of claim 83, wherein said matching further comprises:
resolving said match matrix using said match matrix score values, wherein, for each of at least a subset of said rows corresponding to said first plurality of objects, said resolving produces a column from said second plurality of objects in said second graphical program, wherein said produced column has a match matrix element with a highest score value for the respective row.

86. The memory medium of claim 70,
wherein said first graphical program comprises a first user interface panel including a subset of said first plurality of objects for displaying one or more of data output and data input;

wherein said second graphical program comprises a second user interface panel including a subset of said second plurality of objects for displaying one or more of data output and data input;

wherein said matching produces a user interface panel match matrix comprising matching information;

wherein said determining differences includes determining differences between said first user interface panel and said second user interface panel which comprises:

comparing matching top-level objects of said first and second user interface panels to determine differences between said top-level objects using said matching information;

comparing low-level objects of said top-level objects to determine differences between said low-level objects using said matching information;

storing said differences in response to said comparing matching top-level objects of said first and second user interface panels and said comparing low-level objects of said top-level objects.

87. The memory medium of claim 57, wherein said differences are useable in determining differences between the first graphical program and the second graphical program.

88. The memory medium of claim 57, wherein said differences are useable in determining errors in at least one of the first graphical program and the second graphical program.

89. The memory medium of claim 57, wherein said differences are useable in eliminating errors in at least one of the first graphical program and the second graphical program.

90. The memory medium of claim 57, wherein the program instructions are further executable to implement:

modifying at least one of the first graphical program and the second graphical program to eliminate errors in at least one of the first graphical program and the second graphical program, wherein said modifying is performed in response to said differences.

91. The memory medium of claim 57, wherein the first graphical program comprises interconnected graphical objects which specify operation of the first graphical program, and wherein the second graphical program comprises interconnected graphical objects which specify operation of the second graphical program.

92. The memory medium of claim 57, wherein the first graphical program comprises interconnected icons which specify operation of the first graphical program, and wherein the second graphical program comprises interconnected icons which specify operation of the second graphical program.

* * * * *

UNITED STATES PATENT AND TRADEMARK OFFICE
CERTIFICATE OF CORRECTION

PATENT NO. : 6,138,270

DATED : October 24, 2000

INVENTOR(S) : Ray Hsu

It is certified that error appears in the above-identified patent and that said Letters Patent is hereby corrected as shown below:

In the Claims:

Claim 1, col. 17, line 13, please delete "gaphical" and substitute --graphical--.

Claim 14, col. 18, line 19, please delete "functions" and substitute --function--.

Signed and Sealed this

Eighth Day of May, 2001

Attest:

NICHOLAS P. GODICI

Attesting Officer    Acting Director of the United States Patent and Trademark Office

UNITED STATES PATENT AND TRADEMARK OFFICE
CERTIFICATE OF CORRECTION

| | | |
|---|---|---|
| PATENT NO. | : 6,138,270 | Page 1 of 1 |
| APPLICATION NO. | : 09/339340 | |
| DATED | : October 24, 2000 | |
| INVENTOR(S) | : Ray Hsu | |

It is certified that error appears in the above-identified patent and that said Letters Patent is hereby corrected as shown below:

In the Claims:

Claim 1, col. 17, line 13, please delete "gaphical" and substitute --graphical--.

Claim 14, col. 18, line 19, please delete "functions" and substitute --function--.

Signed and Sealed this

Seventh Day of December, 2010

David J. Kappos
*Director of the United States Patent and Trademark Office* though US006138270C1

(12) EX PARTE REEXAMINATION CERTIFICATE (7751st)
United States Patent
Hsu

(10) Number: US 6,138,270 C1
(45) Certificate Issued: Sep. 21, 2010

(54) SYSTEM, METHOD AND MEMORY MEDIUM FOR DETECTING DIFFERENCES BETWEEN GRAPHICAL PROGRAMS

(75) Inventor: Ray Hsu, Austin, TX (US)

(73) Assignee: National Instruments Corporation, Austin, TX (US)

Reexamination Request:
No. 90/009,049, Feb. 20, 2008

Reexamination Certificate for:
| | |
|---|---|
| Patent No.: | 6,138,270 |
| Issued: | Oct. 24, 2000 |
| Appl. No.: | 09/339,340 |
| Filed: | Jun. 23, 1999 |

Certificate of Correction issued May 8, 2001.

Related U.S. Application Data

(63) Continuation of application No. 08/870,262, filed on Jun. 6, 1997, now Pat. No. 5,974,254.

(51) Int. Cl.
*G06F 9/44* (2006.01)

(52) U.S. Cl. .................................. 717/125; 717/131
(58) Field of Classification Search .................. None
See application file for complete search history.

(56) References Cited

U.S. PATENT DOCUMENTS

| | | | | |
|---|---|---|---|---|
| 4,901,221 A | * | 2/1990 | Kodosky et al. | ............ 715/771 |
| 5,974,254 A | | 10/1999 | Hsu | |
| 6,138,270 A | | 10/2000 | Hsu | |

OTHER PUBLICATIONS

Ebeling C. Gemini II: A Second Generation Layout Validation Program, Proceedings of the Conference on Computer Aided Design (ICCAD), pp. 322–235, 1988.

Samuel Bates and Susan Horwitz, "Incremental Program Testing using Program Dependence Graphs," Proceedings ACM Conference on Principles of Programming Languages, 1993.

(Continued)

*Primary Examiner*—Zoila E Cabrera

(57) ABSTRACT

A method for detecting differences between two graphical programs. The graphical programs comprise graphical code. The graphical programs may include objects, preferably arranged as a user interface panel, including controls and indicators, and a block diagram, including graphical code function blocks connected together as a data flow program. Directed graph data structures are created to represent the graphical programs, wherein the vertices of the graphs are the objects of the graphical programs and the edges of the graphs are data flow signals of the block diagram and/or hierarchical relationships of the user interface panel objects. The objects of the two graphical programs are heuristically matched together using a scoring approach. The scores are stored in a match matrix and indicate a degree of similarity between an object in the first graphical program and an object in the second graphical program according to one or more criteria. The matching criteria include object type, object connectivity and object attributes. The match matrix is resolved to generate a 1:1 or 1:0 correspondence between the objects in the first and second graphical programs based on the match scores. The matching information is used to determine differences in the two graphical programs. First, using the matching information and a compare engine, the objects are grouped into exact matching subgraphs and then into non-exact matching subgraphs. Non-exact matching subgraphs are matched and merged where possible using transitivity. Objects in the non-exact matching subgraphs are compared using the compare engine to detect additional differences. All detected differences are stored and displayed for the user. The differences may be displayed in various manners such as drawing a circle around the differences, highlighting the differences by color, and/or displaying a textual description of the differences.

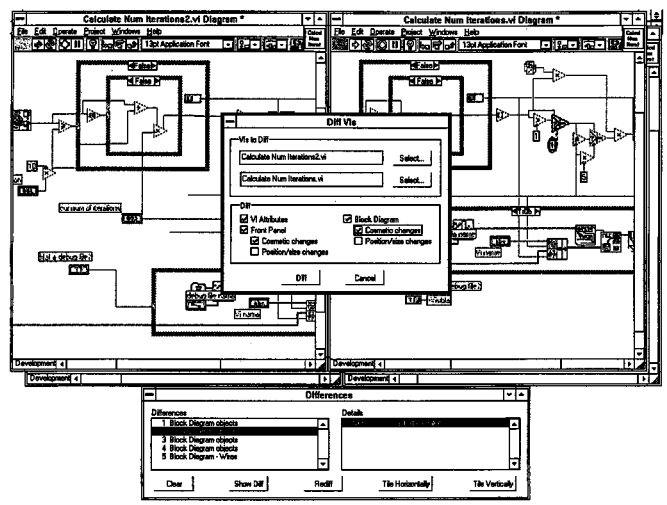

OTHER PUBLICATIONS

H. Kalviainen and E. Oja. Comparisons of attributed graph matching algorithms for computer vision. In STeP-90 Finnish Articifical Intelligence Symposium, University of Oulu. pp. 354-368, 1990.

Edward H. Sussenguth, Jr. A Graph-Theoretic Algorithm for Matching Chemical Structures. p. 36-43, 1964.

Stephen H. Unger GIT—A Heuristic Program for Testing Pairs of Directed Line Graphs for Isomorphism. Communications of the ACM, vol. 7, No. 1, Jan. 1964. pp. 26-34.

D.G. Corneil and C.C. Gotlieb. An Efficient Algorithm for Graph Isomorphism. Journal of the Association for Computing Machinery, vol. 17, No. 1, Jan. 1970. pp. 51-64.

H.G. Barrow, A.P. Ambler, and R.M. Burstall. "Some Techniques for Recognising Structures in Pictures," in Frontiers of Pattern Recognition, 1972.

A.T. Berztiss. A Backtrack Procedure for Isomorphism of Directed Graphs. Journal of the Association for Computing Machinery, vol. 20, No. 3, Jul. 1973. pp. 365-377.

Ronald C. Read and Derek G. Corneil. The Graph Isomorphism Disease. The Journal of Graph Theory, vol. 1, 1977. pp. 339-363.

D.G. Corneil and D.G. Kirkpatrick. A Theoretical Analysis of Various Heuristics for the Graph Isomorphism Problem. Society for Industrial and Applied Mathematics, vol. 9, No. 2, May 1980. pp. 281-297.

Wen-Hsiang Tsai and King-Sun Fu. Erroe-Correcting Isomorphisms of Attributed Relational Graphs for Pattern Analysis. IEEE Transactions on Systems, Man, and Cybernetics, vol. 9, No. 12, Dec. 1979. pp. 757-768.

Brendan D. McKay. Practical Graph Isomorphism. Congressus Numerantium, vol. 30, 1981. pp. 45-87.

I. Ablasser and U. Jager. Circuit Recognition and Verification Based on Layout Information. 18th Design Automation Conference, 1981. pp. 684-689.

Miles Ohlrich, Carl Ebeling, Eka Ginting, and Lisa Sather. SubGemini: Identifying SubCircuits using a Fast Subgraph Isomorphism Algorithm. 30th ACM/IEEE Design Automation Conference, 1993. pp. 31-37.

Jonathan L. Gross, Jay Yellen; "Handbook of Graph Theory (Discrete Mathematics and Its Applications)"; ISBN 1584880902; Dec. 29, 2003; Chapters 2, 3, and 10 (pp. 56-192; 952-1073).

J. R. Ullmann. An algorithm for subgraph isomorphism. J. ACM, 23(1):31-42, 1976.

F. Luellau, T. Hoepken, and E. Barke. A technology independent block extraction algorithm. In 21st Proceedings of the Design Automation Conference on Design automation, pp. 610-615. IEEE Press, 1984.

M. Takashima, A. Ikeuchi, S. Kojima, T. Tanaka, T. Saitou, and J. Ichi Sakata. A circuit comparison system with rule-based functional isomorphism checking. In Proceedings of the 25th ACM/IEEE conference on Design automation, pp. 512-516. IEEE Computer Society Press, 1988.

J. Laski and W. Szermer. Identification of program modifications and its applications in software maintenance. In *Proceedings of IEEE Conference on Software Maintenance*, pp. 282-290, Orlando, FL, Nov. 1992.

Susan Horwitz, "Identifying the Semantic and Textual Differences Between Two Versions of a Program," Proceedings of the ACM SIGPLAN' 90 Conferencing on Programming Language, 1990.

* cited by examiner

US 6,138,270 C1

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 42, 47, 48, 49, 50, 56 and 57 are determined to be patentable as amended.

Claims 2-30, 34-41, 43-46, 51-55, 58-85, and 87-92, dependent on an amended claim, are determined to be patentable.

New claims 93-294 are added and determined to be patentable.

Claims 31-33 and 86 were not reexamined.

1. A computer-implemented method for detecting differences between first and second graphical programs, wherein the method executes on a computer including a display, the method comprising:
    determining differences between said first graphical program and said second graphical program, wherein said first graphical program and said second graphical program each comprise graphical code, *wherein each of said first and second graphical programs was created in response to user input assembling a plurality of icons and connecting the plurality of icons on a display screen to create the graphical code*; and
    displaying an indication of said differences on the display;
    wherein said differences are used to evaluate at least one of the first graphical program and the second graphical program.

42. A computer-implemented method for detecting differences between first and second graphical programs, wherein the method executes on a computer including a display, the method comprising:
    creating the first graphical program, wherein the first graphical program comprises first graphical code;
    creating the second graphical program, wherein the second graphical program comprises second graphical code, *wherein each of said first and second graphical programs was created in response to user input assembling a plurality of icons and connecting the plurality of icons on a display screen to create the graphical code*;
    determining differences between said first graphical program and said second graphical program; and
    displaying an indication of said differences on the display;
    wherein said differences are used to evaluate at least one of the first graphical program and the second graphical program.

47. A computer-implemented method for detecting differences between first and second graphical programs, wherein the method executes on a computer including a display, the method comprising:
    creating the first graphical program, wherein the first graphical program comprises first graphical code, wherein the first graphical program comprises a first plurality of objects;
    creating the second graphical program, wherein the *secondd* graphical program comprises second graphical code, wherein the second graphical program comprises a second plurality of objects, *wherein each of said first and second graphical programs was created in response to user input assembling a plurality of icons and connecting the plurality of icons on a display screen to create the graphical code*;
    determining differences between said first plurality of objects in said first graphical program and said second plurality of objects in said second graphical program; and
    displaying an indication of said differences on the display;
    wherein said differences are used to evaluate at least one of the first graphical program and the second graphical program.

48. A computer-implemented method for detecting differences between first and second graphical programs, wherein the method executes on a computer including a display, the method comprising:
    creates the first graphical program, wherein the first graphical program comprises first graphical code, wherein the first graphical program comprises a first plurality of objects;
    creating the second graphical program, wherein the second graphical program comprises second graphical code, wherein the second graphical program comprises a second plurality of objects, *wherein each of said first and second graphical programs was created in response to user input assembling a plurality of icons and connecting the plurality of icons on a display screen to create the graphical code*;
    matching said first plurality of objects of said first graphical program with said second plurality of objects of said second graphical program;
    determining differences between said first graphical program and said second graphical program in response to said matching; and
    displaying an indication of said differences on the display;
    wherein said differences are used to evaluate at least one of the first graphical program and the second graphical program.

49. A computer-implemented method for detecting differences between first and second graphical programs, wherein the method executes on a computer including a display, wherein the first and second graphical programs comprise graphical code, *wherein each of said first and second graphical programs was created in response to user input assembling a plurality of icons and connecting the plurality of icons on a display screen to create the graphical code*, wherein the first graphical program comprises a first plurality of objects and wherein the second graphical program comprises a second plurality of objects, the method comprising:
    matching said first plurality of objects of said first graphical program with said second plurality of objects of said second graphical program;
    determining differences between said first graphical program and said second graphical program in response to said matching; and
    displaying an indication of said differences on the display screen;

wherein said differences are used to evaluate at least one of the first graphical program and the second graphical program.

50. A computer system for detecting differences between first and second graphical programs, comprising:

a central processing unit (CPU);

a display coupled to the CPU; and a memory medium coupled to the CPU which stores said first and second graphical programs, wherein each of the said first and second graphical programs comprises graphical code, *wherein each of said first and second graphical programs was created in response to user input assembling a plurality of icons and connecting the plurality of icons on a display screen to create the graphical code*, wherein the memory medium also stores a difference program for detecting differences between said first and second graphical programs;

wherein said CPU is operable to execute said difference program to determine differences between said first graphical program and said second graphical program and to display an indication of said differences on the display;

wherein the differences are used to evaluate at least one of the first graphical program and the second graphical program.

56. A computer system for detecting differences between first and second graphical programs, comprising:

a central processing unit (CPU);

a display coupled to the CPU; and a memory medium coupled to the CPU which stores said first and second graphical programs, wherein each of the said first and second graphical programs comprises graphical code, *wherein each of said first and second graphical programs was created in response to user input assembling a plurality of icons and connecting the plurality of icons on a display screen to create the graphical code*, wherein the first graphical program comprises a first plurality of objects and wherein the second graphical program comprises a second plurality of objects, the memory medium also stores a difference program for detecting differences between said first and second graphical programs;

wherein said CPU is operable to execute said difference program to:

match said first plurality of objects of said first graphical program with said second plurality of objects of said second graphical program;

determine differences between said first graphical program and said second graphical program in response to the matching; and display an indication of said differences on the display;

wherein said differences are used to evaluate at least one of the first graphical program and the second graphical program.

57. A computer-readable memory medium comprising program instructions for detecting differences between first and second graphical programs, wherein the program instructions execute on a computer including a display, wherein the program instructions are executable to implement:

determining differences between said first graphical program and said second graphical program, wherein said first graphical program and said second graphical program each comprise graphical code, *wherein each of said first and second graphical programs was created in response to user input assembling a plurality of icons and connecting the plurality of icons on a display screen to create the graphical code*; and displaying an indictation of said differences on the display;

wherein said differences are used to evaluate at least one of the first graphical program and the second graphical program.

93. *A computer-readable memory medium comprising program instructions for detecting differences between first and second graphical data flow programs, wherein the program instructions execute on a computer including a display, wherein the program instructions are executable to implement:*

*displaying at least one of the first and second graphical data flow programs on the display;*

*determining differences between said first graphical data flow program and said second graphical data flow program, wherein said first graphical data flow program and said second graphical data flow program each comprise graphical code, wherein the first graphical data flow program was created in response to user input assembling a first plurality of objects connected by lines on a display screen, wherein the lines connecting the first plurality of objects indicate flow of data among the first plurality of objects, wherein the second graphical data flow program was created in response to user input assembling a second plurality of objects connected by lines on a display screen, wherein the lines connecting the second plurality of objects indicate flow of data among the second plurality of objects; and*

*displaying an indication of said differences on the display;*

*wherein said differences are used to evaluate at least one of the first graphical data flow program and the seond graphical data flow program.*

94. *The computer-readable memory medium of claim 93, wherein the lines comprise data paths.*

95. *The computer-readable memory medium of claim 93, wherein the lines represent signals.*

96. *The computer-readable memory medium of claim 93, wherein the lines indicate that data produced by one object is used by another object.*

97. *The computer-readable memory medium of claim 93, wherein said determining differences between said first and second graphical data flow programs comprises finding functional differences between said first and second graphical data flow programs, wherein a functional difference indicates a potential difference in execution of said first and second graphical data flow programs.*

98. *The computer-readable memory medium of claim 93, wherein said determining differences between said first and second graphical data flow programs comprises finding cosmetic differences between said first and second graphical data flow programs, wherein a cosmetic difference is a non-functional difference.*

99. *The computer-readable memory medium of claim 93, wherein the program instructions are executable to implement:*

*displaying the first graphical data flow program on the display; and*

*displaying the second graphical data flow program on the display.*

100. *The computer-readable memory medium of claim 93, wherein the program instructions are further executable to implement:*

*storing the first graphical data flow program in memory, wherein the first graphical data flow program was cre-* ated in response to user input selecting first icons for inclusion in the first graphical data flow program, arranging the first icons, and connecting the first icons using the lines;

storing the second graphical data flow program in memory, wherein the second graphical data flow program was created in response to user input selecting second icons for inclusion in the second graphical data flow program, arranging the second icons, and connecting the second icons using the lines.

101. The computer-readable memory medium of claim 93, wherein the program instructions are further executable to implement:

storing the first graphical data flow program in memory, wherein the first graphical data flow program was created in response to user input selecting first icons for inclusion in the first graphical data flow program, arranging the first icons, and connecting the first icons using the lines;

storing the second graphical data flow program in memory, wherein the second graphical data flow program was created in response to user input modifying the first graphical data flow program.

102. The computer-readable memory medium of claim 93, wherein said displaying said differences comprises displaying at least one of said first and second graphical data flow programs, wherein said displaying said differences further comprises highlighting at least a subset of said differences in one or more of said first and second graphical data flow programs.

103. The computer-readable memory medium of claim 93, wherein said first plurality of objects includes controls and indicators of a user interface portion of the first graphical data flow program.

104. The computer-readable memory medium of claim 93, wherein said first and second graphical data flow programs each comprise a block diagram comprising the graphical code and a user interface for displaying one or more of data output from the block diagram and data input to the block diagram;

wherein said determining differences between said first graphical data flow program and said second graphical data flow program comprises:

determining differences between said block diagrams of said first and second graphical data flow programs; and determining differences between user interface elements of said first and second graphical data flow programs.

105. A computer-implemented method for detecting differences between first and second graphical data flow programs, wherein the method executes on a computer including a display, the method comprising:

determining differences between said first graphical data flow program and said second graphical data flow program, wherein said first graphical data flow program and said second graphical data flow program each comprise graphical code, wherein the first graphical data flow program was created in response to user input assembling a first plurality of objects connected by lines on a display screen, wherein the lines connecting the first plurality of objects indicate flow of data among the first plurality of objects, wherein the second graphical data flow program was created in response to user input assembling a second plurality of objects connected by lines on a display screen, wherein the lines connecting the second plurality of objects indicate flow of data among the second plurality of objects;

displaying an indication of said differences on the display;

wherein said differences are used to evaluate at least one of the first graphical data flow program and the second graphical data flow program.

106. The computer-implemented method of claim 105, wherein the lines comprise data paths.

107. The computer-implemented method of claim 105, wherein the lines represent signals.

108. The computer-implemented method of claim 105, wherein the lines indicate that data produced by one object is used by another object.

109. The computer-implemented method of claim 105, further comprising:

displaying the first graphical data flow program on the display; and displaying the second graphical data flow program on the display.

110. The computer-implemented method of claim 105, further comprising:

storing the first graphical data flow program in memory, wherein the first graphical data flow program was created in response to user input selecting first icons for inclusion in the first graphical data flow program, arranging the first icons, and connecting the first icons using the lines;

storing the second graphical data flow program in memory, wherein the second graphical data flow program was created in response to user input selecting second icons for inclusion in the second graphical data flow program, arranging the second icons, and connecting the second icons using the lines.

111. The computer-implemented method of claim 105, further comprising:

storing the first graphical data flow program in memory, wherein the first graphical data flow program was created in response to user input selecting first icons for inclusion in the first graphical data flow program, arranging the first icons, and connecting the first icons using the lines;

storing the second graphical data flow program in memory, wherein the second graphical data flow program was created in response to user input modifying the first graphical data flow program.

112. The computer-implemented method of claim 105, wherein said displaying said differences comprises displaying said first and second graphical data flow programs, wherein said displaying said differences further comprises highlighting at least a subset of said differences between said first and second graphical data flow programs in one or more of said first and second graphical data flow programs.

113. The computer-implemented method of claim 105, wherein said determining differences between said first and second graphical data flow programs comprises finding functional differences between said first and second graphical data flow programs, wherein a functional difference indicates a potential difference in execution of said first and second graphical data flow programs.

114. The computer-implemented method of claim 105, wherein said determining differences between said first and second graphical data flow programs comprises finding cosmetic differences between said first and second graphical data flow programs, wherein a cosmetic difference is a non-functional difference.

115. The computer-implemented method of claim 105, wherein said first plurality of objects includes controls and indicators of a user interface portion of the first graphical data flow program.

116. The computer-implemented method of claim 105, wherein said first and second graphical data flow programs each comprise a block diagram comprising the graphical code and a user interface for displaying one or more of data output from the block diagram and data input to the block diagram;
   wherein said determining differences between said first graphical data flow program and said second graphical data flow program comprises:
      determining differences between said block diagrams of said first and second graphical data flow programs; and
      determining differences between user interface elements of said first and second graphical data flow programs.

117. A computer system for detecting differences between first and second graphical data flow programs, comprising:
   a central processing unit (CPU);
   a display coupled to the CPU; and
   a memory medium coupled to the CPU which stores said first and second graphical data flow programs, wherein each of the first and second graphical data flow programs comprises graphical code, wherein the first graphical data flow program was created in response to user input assembling a first plurality of objects connected by lines on a display screen, wherein the lines connecting the first plurality of objects indicate flow of data among the first plurality of objects, wherein the second graphical data flow program was created in response to user input assembling a second plurality of objects connected by lines on a display screen, wherein the lines connecting the second plurality of objects indicate flow of data among the second plurality of objects, wherein the memory medium also stores a difference program for detecting differences between said first and second graphical data flow programs;
   wherein said CPU is operable to execute said difference program to determine differences between said first graphical data flow program and said second graphical data flow program and to display an indication of said differences on the display;
   wherein said differences are used to evaluate at least one of the first graphical data flow program and the second graphical data flow program.

118. A computer system for detecting differences between first and second graphical data flow programs, comprising:
   means for determining differences between said first graphical data flow program and said second graphical data flow program, wherein said first graphical data flow program and said second graphical data flow program each comprise graphical code, wherein the first graphical data flow program was created in response to user input assembling a first plurality of objects connected by lines on a display screen, wherein the lines connecting the first plurality of objects indicate flow of data among the first plurality of objects, wherein the second graphical data flow program was created in response to user input assembling a second plurality of objects connected by lines on a display screen, wherein the lines connecting the second plurality of objects indicate flow of data among the second plurality of objects;
   means for displaying an indication of said differences on a display;
   wherein said differences are used to evaluate at least one of the first graphical data flow program and the second graphical data flow program.

119. A computer-readable memory medium comprising program instructions for detecting differences between first and second graphical programs, wherein the program instructions execute on a computer including a display, wherein the program instructions are executable to implement:
   determining differences between said first graphical program and said second graphical program, wherein said first graphical program and said second graphical program each comprise graphical code, wherein the first graphical program was created in response to user input assembling a first plurality of objects connected by lines on a display, wherein the lines connecting the first plurality of objects indicate flow of signals among the first plurality of objects, wherein the second graphical program was created in response to user input assembling a second plurality of objects connected by lines on a display, wherein the lines connecting the second plurality of objects indicate flow of signals among the second plurality of objects; and
   displaying an indication of said differences on the display;
   wherein said differences are used to evaluate at least one of the first graphical program and the second graphical program.

120. The computer-readable memory medium of claim 119, wherein, for each of the first and second graphical programs, the signals specify a flow of data through the respective graphical programs.

121. The computer-readable memory medium of claim 119, wherein said determining differences between said first and second graphical programs comprises finding functional differences between said first and second graphical programs, wherein a functional difference indicates a potential difference in execution of said first and second graphical programs.

122. The computer-readable memory medium of claim 119, wherein said determining differences between said first and second graphical programs comprises finding cosmetic differences between said first and second graphical programs, wherein a cosmetic difference is a non-functional difference.

123. The computer-readable memory medium of claim 119, wherein the program instructions are executable to implement:
   displaying the first graphical program on the display; and
   displaying the second graphical program on the display.

124. The computer-readable memory medium of claim 119, wherein the program instructions are further executable to implement:
   storing the first graphical program in memory, wherein the first graphical program was created in response to user input selecting first icons for inclusion in the first graphical program, arranging the first icons, and connecting the first icons using the lines;
   storing the second graphical program in memory, wherein the second graphical program was created in response to user input selecting second icons for inclusion in the second graphical program, arranging the second icons, and connecting the second icons using the lines.

125. The computer-readable memory medium of claim 119, wherein the program instructions are further executable to implement:
   storing the first graphical program in memory, wherein the first graphical program was created in response to user input selecting first icons for inclusion in the first graphical program, arranging the first icons, and connecting the first icons using the lines;

storing the second graphical program in memory, wherein the second graphical program was created in response to user input modifying the first graphical program.

126. The computer-readable memory medium of claim 119, wherein said displaying said differences comprises displaying at least one of said first and second graphical programs, wherein said displaying said differences further comprises highlighting at least a subset of said differences in one or more of said first and second graphical programs.

127. The computer-readable memory medium of claim 119, wherein said first plurality of objects includes controls and indicators of a user interface portion of the first graphical program.

128. The computer-readable memory medium of claim 119, wherein said first and second graphical programs each comprise a block diagram comprising the graphical code and a user interface for displaying one or more of data output from the block diagram and data input to the block diagram;

wherein said determining differences between said first graphical program and said second graphical program comprises:
determining differences between said block diagrams of said first and second graphical programs; and
determining differences between user interface elements of said first and second graphical programs.

129. The computer-implemented method for detecting differences between first and second graphical programs, wherein the method executes on a computer including a display, the method comprising:

determining differences between said first graphical program and said second graphical program, wherein said first graphical program and said second graphical program each comprise graphical code, wherein the first graphical program was created in response to user input assembling a first plurality of objects connected by lines on a display, wherein the lines connecting the first plurality of objects indicate flow of signals among the first plurality of objects, wherein the second graphical program was created in response to user input assembling a second plurality of objects connected by lines on a display, wherein the lines connecting the second plurality of objects indicate flow of signals among the second plurality of objects; and displaying an indication of said differences on the display; wherein said differences are used to evaluate at least one of the first graphical program and the second graphical program.

130. The computer-implemented method of claim 129, wherein, for each of the first and second graphical programs, the signals specify a flow of data through the respective graphical programs.

131. The computer-implemented method of claim 129, wherein said determining differences between said first and second graphical programs comprises finding functional differences between said first and second graphical programs, wherein a functional difference indicates a potential difference in execution of said first and second graphical programs.

132. The computer-implemented method of claim 129, wherein said determining differences between said first and second graphical programs comprises finding cosmetic differences between said first and second graphical programs, wherein a cosmetic difference is a non-functional difference.

133. The computer-implemented method of claim 129, further comprising:
displaying the first graphical program on the display; and
displaying the second graphical program on the display.

134. The computer-implemented method of claim 129, further comprising:

storing the first graphical program in memory, wherein the first graphical program was created in response to user input selecting first icons for inclusion in the first graphical program, arranging the first icons, and connecting the first icons using the lines;

storing the second graphical program in memory, wherein the second graphical program was created in response to user input selecting second icons for inclusion in the second graphical program, arranging the second icons, and connecting the second icons using the lines.

135. The computer-readable memory medium of claim 129, further comprising:

storing the first graphical program in memory, wherein the first graphical program was created in response to user input selecting first icons for inclusion in the first graphical program, arranging the first icons, and connecting the first icons using the lines;

storing the second graphical program in memory, wherein the second graphical program was created in response to user input modifying the first graphical program.

136. The computer-implemented method of claim 129, wherein said displaying said differences comprises displaying at least one of said first and second graphical programs, wherein said displaying said differences further comprises highlighting at least a subset of said differences in one or more of said first and second graphical programs.

137. The computer-implemented method of claim 129, wherein said first plurality of objects includes controls and indicators of a user interface portion of the first graphical program.

138. The computer-implemented method of claim 129, wherein said first and second graphical programs each comprise a block diagram comprising the graphical code and a user interface for displaying one or more of data output from the block diagram and data input to the block diagram;

wherein said determining differences between said first graphical program and said second graphical program comprises:
determining differences between said block diagrams of said first and second graphical programs; and
determining differences between user interface elements of said first and second graphical programs.

139. A computer system for detecting differences between first and second graphical programs, comprising:

a central processing unit (CPU);

a display coupled to the CPU; and a memory medium coupled to the CPU which stores said first and second graphical programs, wherein each of the first and second graphical programs comprises graphical code, wherein the first graphical program was created in response to user input assembling a first plurality of objects connected by lines on a display, wherein the lines connecting the first plurality of objects indicate flow of signals among the first plurality of objects, wherein the second graphical program was created in response to user input assembling a second plurality of objects connected by lines on a display, wherein the lines connecting the second plurality of objects indicate flow of signals among the second plurality of objects, wherein the memory medium also stores a difference program for detecting differences between said first and second graphical programs;

wherein said CPU is operable to execute said difference program to determine differences between said first graphical program and said second graphical program and to display an indication of said differences on the display;

wherein said differences are used to evaluate at least one of the first graphical program and the second graphical program.

140. A computer system for detecting differences between first and second graphical programs, comprising:

means for determining differences between said first graphical program and said second graphical program, wherein said first graphical program and said second graphical program each comprise graphical code, wherein the first graphical program was created in response to user input assembling a first plurality of objects connected by lines on a display, wherein the lines connecting the first plurality of objects indicate flow of signals among the first plurality of objects, wherein the second graphical program was created in response to user input assembling a second plurality of objects connected by lines on a display, wherein the lines connecting the second plurality of objects indicate flow of signals among the second plurality of objects; and means for displaying an indication of said differences on a display;

wherein said differences are used to evaluate at least one of the first graphical program and the second graphical program.

141. The computer-readable memory medium comprising program instructions for detecting differences between first and second grahical programs, wherein the program instructions execute on a computer including a display, wherein the program instructions are executable to implement:

determining differences between said first graphical program and said second graphical program, wherein said first graphical program and said second graphical program each comprise graphical code, wherein each of said first and second graphical programs was created in response to user input assembling a pluraity of icons and connecting the plurality of icons on a display screen to create the graphical code, wherein said first graphical program comprises a first plurality of objects, wherein said second graphical program comprises a second plurality of objects;

wherein at least one of the first plurality of objects comprises a first graphical structure which indicates iteration of one or more other objects in the first graphical program;

displaying an indication of said differences on the display;

wherein said differences are used to evaluate at least one of the first graphical program and the second graphical program.

142. The computer-readable memory medium of claim 141, wherein the first graphical structure is a code execution structure.

143. The computer-readable memory medium of claim 141, wherein the first graphical structure is a loop structure.

144. The computer-readable memory medium of claim 141, wherein the first graphical structure is a for loop.

145. The computer-readable memory medium of claim 141, wherein the first graphical structure is a while loop.

146. The computer-readable memory medium of claim 141, wherein the first graphical structure comprises an interior portion, wherein the one or more other objects are contained within the interior portion of the first graphical structure.

147. The computer-readable memory medium of claim 141, wherein the program instructions are executable to implement:

displaying the first graphical program on the display;

wherein the first graphical structure comprises an interior portion, wherein the one or more other objects are displayed within the interior portion of the first graphical structure in the first graphical program.

148. The computer-readable memory medium of claim 141, wherein at least one of the second plurality of objects comprises a second graphical structure which indicates iteration of one or more other objects in the second graphical program;

wherein said determining differences between said first graphical program and said second graphical program comprises finding functional differences between the first graphical structure and the second graphical structure, wherein a functional difference indicates a potential difference in execution of the first graphical structure and the second graphical structure.

149. The computer-readable memory medium of claim 141, wherein at least one of the second plurality of objects comprises a second graphical structure which indicates iteration of one or more other objects in the second graphical program;

wherein said determining differences between said first graphical program and said second graphical program comprises finding cosmetic differences between the first graphical structure and the second graphical structure, wherein a cosmetic difference is a non-functional difference.

150. The computer-readable memory medium of claim 141, wherein the program instructions are executable to implement:

displaying the first graphical program on the display; and
displaying the second graphical program on the display.

151. The computer-readable memory medium of claim 141, wherein the program instructions are further executable to implement:

storing the first graphical program in memory, wherein the first graphical program was created in response to user input selecting first icons for inclusion in the first graphical program, arranging the first icons, and connecting the first icons using the lines;

storing the second graphical program in memory, wherein the second graphical program was created in response to user input selecting second icons for inclusion in the second graphical program, arranging the second icons, and connecting the second icons using the lines.

152. The computer-readable memory medium of claim 141, wherein said displaying said differences comprises displaying at least one of said first and second graphical programs, wherein said displaying said differences further comprises highlighting each of said differences in one or more of said first and second graphical programs.

153. The computer-readable memory medium of claim 141, wherein said first plurality of objects includes controls and indicators of a user interface portion of the first graphical program.

154. The computer-readable memory medium of claim 141, wherein said first and second graphical programs each comprise a block diagram comprising the graphical code and a user interface for displaying one or more of data output from the block diagram and data input to the block diagram;
   wherein said determining differences between said first graphical program and said second graphical program comprises:
      determining differences between said block diagrams of said first and second graphical programs; and
      determining differences between user interface elements of said first and second graphical programs.

155. The computer-readable memory medium comprising program instructions for detecting differences between first and second graphical data flow programs, wherein the program instructions execute on a computer including a display, wherein the program instructions are executable to implement:
   determining differences between said first graphical data flow program and said second graphical data flow program, wherein said first graphical data flow program and said second graphical data flow program each comprise graphical code, wherein the first graphical data flow program was created in response to user input assembling a first plurality of objects connected by lines on a display screen, wherein the second graphical data flow program was created in response to user input assembling a second plurality of objects connected by lines on a display screen, wherein, for each of the first and second graphical data flow programs, the lines specify a flow of data through the respective graphical data flow program;
   wherein at least one of the first plurality of objects comprises a first graphical structure which indicates iteration of one or more other objects in the first graphical data flow program;
   displaying an indication of said differences on the display;
   wherein said differences are used to evaluate at least one of the first graphical data flow program and the second graphical data flow program.

156. The computer-readable memory medium of claim 155, wherein the first graphical structure is a code execution structure.

157. The computer-readable memory medium of claim 155, wherein the first graphical structure is a loop structure.

158. The computer-readable memory medium of claim 155, wherein the first graphical structure is a for loop.

159. The computer-readable memory medium of claim 155, wherein the first graphical structure is a while loop.

160. The computer-readable memory medium of claim 155, wherein the first graphical structure comprises an interior portion, wherein the one or more other objects are contained within the interior portion of the first graphical structure.

161. The computer-readable memory medium of claim 155, wherein the program instructions are executable to implement:
   displaying the first graphical data flow program on the display;
   wherein the first graphical structure comprises an interior portion, wherein the one or more other objects are displayed within the interior portion of the first graphical structure in the first graphical data flow program.

162. The computer-readable memory medium of claim 155,
   wherein at least one of the second plurality of objects comprises a second graphical structure which indicates iteration of one or more other objects in the second graphical data flow program;
   wherein said determining differences between said first graphical data flow program and said second graphical data flow program comprises finding functional differences between the first graphical structure and the second graphical structure, wherein a functional difference indicates a potential difference in execution of the first graphical structure and the second graphical structure.

163. The computer-readable memory medium of claim 155,
   wherein at least one of the second plurality of objects comprises a second graphical structure which indicates iteration of one or more other objects in the second graphical data flow program;
   wherein said determining differences between said first graphical data flow program and said second graphical data flow program comprises finding cosmetic differences between the first graphical structure and the second graphical structure, wherein a cosmetic difference is a non-functional difference.

164. The computer-readable memory medium comprising program instructions for detecting differences between first and second graphical programs, wherein the program instructions execute on a computer including a display, wherein the program instructions are executable to implement:
   determining differences between said first graphical program and said second graphical program, wherein said first graphical program and said second graphical program each comprise graphical code, wherein each of said first and second graphical programs was created in response to user input assembling a plurality of icons and connecting the plurality of icons on a display screen to create the graphical code, wherein the first graphical program comprises a first plurality of objects, wherein the second graphical program comprises a second plurality of objects;
   wherein at least one of the first plurality of objects in the first graphical program comprises a first graphical structure which indicates conditional branching of one or more other objects in the first graphical program;
   displaying an indication of said differences on the display;
   wherein said differences are used to evaluate at least one of the first graphical program and the second graphical program.

165. The computer-readable memory medium of claim 164, wherein the first graphical structure is a code execution structure.

166. The computer-readable memory medium of claim 164, wherein the first graphical structure is a case structure.

167. The computer-readable memory medium of claim 164, wherein the first graphical structure includes an input for receiving a case selection value;
   wherein the first graphical program comprises a first object which is connected to the input of the first graphical structure, wherein the first object outputs the case selection value which is provided to the input of the first graphical structure.

168. The computer-readable memory medium of claim 164, wherein the case selection value is a Boolean value, wherein the first graphical structure visually indicates execution of a first plurality of objects if the Boolean value is true, and wherein the first graphical structure visually indicates execution of a second plurality of objects if the Boolean value is false.

169. The computer-readable memory medium of claim 164, wherein the first graphical structure comprises an interior portion, wherein the one or more other objects are contained within the interior portion of the first graphical structure.

170. The computer-readable memory medium of claim 164, wherein the program instructions are executable to implement:
   displaying the first graphical program on the display;
   wherein the first graphical structure comprises an interior portion, wherein the one or more other objects are displayed within the interior portion of the first graphical structure in the first graphical program.

171. The computer-readable memory medium of claim 164,
   wherein at least one of the second plurality of objects comprises a second graphical structure which indicates conditional branching of one or more other objects in the second graphical program;
   wherein said determining differences between said first and second graphical programs comprises finding functional differences between the first graphical structure and the second graphical structure, wherein a functional difference indicates a potential difference in execution of the first graphical structure and the second graphical structure.

172. The computer-readable memory medium of claim 164,
   wherein at least one of the second plurality of objects comprises a second graphical structure which indicates conditional branching of one or more other objects in the second graphical program;
   wherein said determining differences between said first and second graphical programs comprises finding cosmetic differences between the first graphical structure and the second graphical structure, wherein a cosmetic difference is a non-functional difference.

173. The computer-readable memory medium of claim 164, wherein the program instructions are further executable to implement:
   displaying the first graphical program on the display; and
   displaying the second graphical program on the display.

174. The computer-readable memory medium of claim 164, wherein the program instructions are further executable to implement:
   storing the first graphical program in memory, wherein the first graphical program was created in response to user input selecting first icons for inclusion in the first graphical program, arranging the first icons, and connecting the first icons using the lines;
   storing the second graphical program in memory, wherein the second graphical program was created in response to user input selecting second icons for inclusion in the second graphical program, arranging the second icons, and connecting the second icons using the lines.

175. The computer-readable memory medium of claim 164, wherein said displaying said differences comprises displaying at least one of said first and second graphical programs, wherein said displaying said differences further comprises highlighting each of said differences in one or more of said first and second graphical programs.

176. The computer-readable memory medium of claim 164, wherein said first plurality of objects include controls and indicators of a user interface portion of the first graphical program.

177. The computer-readable memory medium of claim 164, wherein said first and second graphical programs each comprise a block diagram comprising the graphical code and a user interface for displaying one or more of data output from the block diagram and data input to the block diagram;
   wherein said determining differences between said first graphical program and said second graphical program comprises:
      determining differences between said block diagrams of said first and second graphical programs; and
      determining differences between user interface elements of said first and second graphical programs.

178. The computer-readable memory medium comprising program instructions for detecting differences between first and second graphical data flow programs, wherein the program instructions execute on a computer including a display, wherein the program instructions are executable to implement:
   determining differences between said first graphical data flow program and said second graphical data flow program, wherein said first graphical data flow program and said second graphical data flow program each comprise graphical code, wherein the first graphical data flow program was created in response to user input assembling a first plurality of objects connected by lines on a display screen, wherein the second graphical data flow program was created in response to user input assembling a second plurality of objects connected by lines on a display screen, wherein, for each of the first and second graphical data flow programs, the lines determine a flow of data through the respective graphical data flow program;
   wherein at least one of the first plurality of objects in the first graphical data flow program comprises a first graphical structure which indicates conditional branching of one or more other objects in the first graphical data flow program;
   displaying an indication of said differences on the display;
   wherein said differences are used to evaluate at least one of the first graphical data flow program and the second graphical data flow program.

179. The computer-readable memory medium of claim 178, wherein the first graphical structure is a code execution structure.

180. The computer-readable memory medium of claim 178, wherein the first graphical structure is a case structure.

181. The computer-readable memory medium of claim 178, wherein the first graphical structure includes an input for receiving a case selection value;
   wherein the first graphical data flow program comprises a first object which is connected to the input of the first graphical structure, wherein the first object outputs the case selection value which is provided to the input of the first graphical structure.

182. The computer-readable memory medium of claim 178, wherein the case selection value is a Boolean value, wherein the first graphical structure visually indicates execution of a first plurality of objects if the Boolean value is true, and wherein the first graphical structure visually indicates execution of a second plurality of objects if the Boolean value is false.

183. The computer-readable memory medium of claim 178, wherein the first graphical structure comprises an interior portion, wherein the one or more other objects are contained within the interior portion of the first graphical structure.

184. The computer-readable memory medium of claim 178, wherein the program instructions are executable to implement:

displaying the first graphical data flow program on the display;

wherein the first graphical structure comprises an interior portion, wherein the one or more other objects are displayed within the interior portion of the first graphical structure in the first graphical data flow program.

185. The computer-readable memory medium of claim 178, wherein at least one of the second plurality of objects comprises a second graphical structure which indicates conditional branching of one or more other objects in the second graphical data flow program;

wherein said determining differences between said first and second graphical data flow programs comprises finding functional differences between the first graphical structure and the second graphical structure, wherein a functional difference indicates a potential difference in execution of the first graphical structure and the second graphical structure.

186. The computer-readable memory medium of claim 178, wherein at least one of the second plurality of objects comprises a second graphical structure which indicates conditional branching of one or more other objects in the second graphical data flow program;

wherein said determining differences between said first and second graphical data flow programs comprises finding cosmetic differences between the first graphical structure and the second graphical structure, wherein a cosmetic difference is a non-functional difference.

187. The computer-readable memory medium comprising program instructions for detecting differences between first and second graphical programs, wherein the program instructions execute on a computer including a display, wherein the program instructions are executable to implement:

determining differences between said first graphical program and said second graphical program, wherein said first graphical program and said second graphical program each comprise graphical code, wherein each of said first and second graphical programs was created in response to user input assembling a plurality of icons and connecting the plurality of icons on a display screen to create the graphical code, wherein the first graphical program comprises a first plurality of objects, wherein the second graphical program comprises a second plurality of objects;

wherein at least one of the first plurality of objects in the first graphical program comprises a first graphical structure which indicates control flow of one or more other objects in the first graphical program;

displaying an indication of said differences on the display;

wherein said differences are used to evaluate at least one of the first graphical program and the second graphical program.

188. The computer-readable memory medium of claim 187, wherein the first graphical structure comprises an interior portion, wherein the one or more other objects are contained within the interior portion of the first grahical structure.

189. The computer-readable memory medium of claim 187, wherein the program instructions are executable to implement:

displaying the first graphical program on the display;

wherein the first graphical structure comprises an interior portion, wherein the one or more other objects are displayed within the interior portion of the first graphical structure in the first graphical program.

190. The computer-readable memory medium of claim 187, wherein the first graphical structure is a case structure.

191. The computer-readable memory medium of claim 187, wherein the first graphical structure is a loop structure.

192. The computer-readable memory medium of claim 187, wherein at least one of the second plurality of objects comprises a second graphical structure which indicates control flow of one or more other objects in the seond graphical program;

wherein said determining differences between said first graphical program and said second graphical program comprises finding functional differences between the first graphical structure and the second graphical structure, wherein a functional difference indicates a potential difference in execution of the first graphical structure and the second graphical structure.

193. The computer-readable memory medium of claim 187, wherein at least one of the second plurality of objects comprises a second graphical structure which indicates control flow of one or more other objects in the second graphical program;

wherein said determining differences between said first graphical program and said second graphical program comprises finding cosmetic differences between the first graphical structure and the second graphical structure, wherein a cosmetic difference is a non-funtional difference.

194. The computer-readable memory medium of claim 187, wherein the program instructions are executable to implement:

displaying the first graphical program on the display; and displaying the second graphical program on the display.

195. The computer-readable memory medium of claim 187, wherein the program instructions are further executable to implement:

storing the first graphical program in memory, wherein the first graphical program was created in response to user input selecting first icons for inclusion in the first graphical program, arranging the first icons, and connecting the first icons using the lines;

storing the second graphical program in memory, wherein the second graphical program was created in response to user input selecting second icons for inclusion in the second graphical program, arranging the second icons, and connecting the second icons using the lines.

196. The computer-readable memory medium of claim 187, wherein said displaying said differences comprises displaying at least one of said first and second graphical programs, wherein said displaying said differences further comprises highlighting each of said differences in one or more of said first and second graphical programs.

197. The computer-readable memory medium of claim 187, wherein said plurality of objects includes controls and indicators of a user interface portion of the first graphical program.

198. The computer-readable memory medium of claim 187, wherein said first and second graphical programs each comprise a block diagram comprising the graphical code and a user interface for displaying one or more of data output from the block diagram and data input to the block diagram;

wherein said detemining differences between said first graphical program and said second graphical program comprises:
determining differences between said block diagrams of said first and second graphical programs; and
determining differences between user interface elements of said first and second graphical programs.

199. A computer-readable memory medium comprising program instructions for detecting differences between first and second graphical data flow programs, wherein the program instructions execute on a computer including a display, wherein the program instructions are executable to implement:
determining differences between said first graphical data flow program and said second graphical data flow program, wherein said first graphical data flow program and said second graphical data flow program each comprise graphical code, wherein the first graphical data flow program was created in response to user input assembling a first plurality of objects connected by lines on a display screen, wherein the second graphical data flow program was created in response to user input assembling a second plurality of objects connected by lines on a display screen, wherein, for each of the first and second graphical data flow programs, the lines indicate a flow of data through the respective graphical code;
wherein at least one of the first plurality of objects in the first graphical data flow program comprises a first graphical structure which indicates control flow of one or more other objects in the first graphical data flow program;
displaying an indication of said differences on the display;
wherein said differences are used to evaluate at least one of the first graphical data flow program and the second graphical program.

200. The computer-readable memory medium of claim 199, wherein the first graphical structure comprises an interior portion, wherein the one or more other objects are contained within the interior portion of the first graphical structure.

201. The computer-readable memory medium of claim 199, wherein the program instructions are executable to implement:
displaying the first graphical program on the display;
wherein the first graphical structure comprises an interior portion, wherein the one or more other objects are displayed within the interior portion of the first graphical structure in the first graphical program.

202. The computer-readable memory medium of claim 199, wherein the first graphical structure is a case structure.

203. The computer-readable memory medium of claim 199, wherein the first graphical structure is a loop structure.

204. The computer-readable memory medium of claim 199,
wherein at least one of the second plurality of objects comprises a second graphical structure which indicates control flow of one or more other objects in the second graphical data flow program;
wherein said determining differences between said first graphical data program and said second graphical data flow program comprises finding functional differences between the first graphical structure and the second graphical structure, wherein a functional difference indicates a potential difference in execution of the first graphical structure and the second graphical structure.

205. The computer-readable memory medium of claim 199,
wherein at least one of the second plurality of objects comprises a second graphical structure which indicates control flow of one or more other objects in the second graphical data flow program;
wherein said determining differences between said first graphical data flow program and said second graphical data flow program comprises finding cosmetic differences between the first graphical structure and the second graphical structure, wherein a cosmetic difference is a non-functional difference.

206. A computer-readable memory medium comprising program instructions for detecting differences between first and second graphical programs, wherein the program instructions execute on a computer including a display, wherein the program instructions are executable to implement:
displaying the first graphical program on the display, wherein the first graphical program comprises a first plurality of objects, wherein at least one of the first plurality of objects visually indicates an instrument input/output function in the first graphical program;
determining differences between said first graphical program and said second graphical program, wherein said first graphical program and said second graphical program each comprise graphical code, wherein each of said first and second graphical programs was created in response to user input assembling a plurality of icons and connecting the plurality of icons on a display screen to create the graphical code, wherein the first graphical program comprises the first plurality of objects, wherein the second graphical program comprises a second plurality of objects; and
displaying an indication of said differences on the display;
wherein said differences are used to evaluate at least one of the first graphical program and the second graphical program.

207. A computer-readable memory medium comprising program instructions for detecting differences between first and second graphical data flow programs, wherein the program instructions execute on a computer including a display, wherein the program instructions are executable to implement:
determining differences between said first graphical data flow program and said second graphical data flow program, wherein said first graphical data flow program and said second graphical data flow program each comprise graphical code, wherein each of the first and second graphical data flow programs was created in response to user input assembling a plurality of icons and connecting the plurality of icons on a display screen to create the graphical code, wherein the first graphical data flow program comprises a first plurality of objects and wherein the second graphical data flow program comprises a second plurality of objects;
wherein the first plurality of objects comprises a first object which is executable to perform an instrument input/output function, wherein during display the first graphical data flow program comprises an icon which visually indicates the instrument input/output function in the first graphical data flow program;
displaying an indication of said differences on the display;
wherein said differences are used to evaluate at least one of the first graphical data flow program and the second graphical data flow program.

208. A computer-readable memory medium comprising program instructions for detecting differences between first and second graphical programs, wherein the program instructions execute on a computer including a display, wherein the program instructions are executable to implement:

- displaying the first graphical program on the display, wherein the first graphical program comprises a first plurality of objects, wherein at least one of the first plurality of objects visually indicates a data acquisition function in the first graphical program;
- determining differences between said first graphical program and said second graphical program, wherein said first graphical program and said second graphical program each comprise graphical code, wherein each of said first and second graphical programs was created in response to user input assembling a plurality of icons and connecting the plurality of icons on a display screen to create the graphical code, wherein the first graphical program comprises the first plurality of objects, wherein the second graphical program comprises a second plurality of objects;
- displaying an indication of said differences on the display;
- wherein said differences are used to evaluate at least one of the first graphical program and the second graphical program.

209. A computer-readable memory medium comprising program instructions for detecting differences between first and second graphical data flow programs, wherein the program instructions execute on a computer including a display, wherein the program instructions are executable to implement:

- determining differences between said first graphical data flow program and said second graphical data flow program, wherein said first graphical data flow program and said second graphical data flow program each comprise graphical code, wherein each of the first and second graphical data flow programs was created in response to user input assembling a plurality of icons and connecting the plurality of icons on a display screen to create the graphical code, wherein the first graphical data flow program comprises a first plurality of objects and wherein the second graphical data flow program comprises a second plurality of objects;
- wherein the first plurality of objects comprises a first object which is executable to perform a data acquisition function, wherein during display the first graphical data flow program comprises an icon which visually indicates the data acquisition function in the first graphical data flow program;
- displaying an indication of said differences on the display;
- wherein the differences are used to evaluate at least one of the first graphical data flow program and the second graphical data flow program.

210. A computer-readable memory medium comprising program instructions for detecting differences between first and second graphical programs, wherein the program instructions execute on a computer including a display, wherein the program instructions are executable to implement:

- displaying the first graphical program on the display, wherein the first graphical program comprises a first plurality of objects, wherein at least one of the first plurality of objects visually indicates a variable reference in the first graphical program;
- determining differences between said first graphical program and said second graphical program, wherein said first graphical program and said second graphical program each comprise graphical code, wherein each of said first and second graphical programs was created in response to user input assembling a plurality of icons and connecting the plurality of icons on a display screen to create the graphical code, wherein the first graphical program comprises the first plurality of objects, wherein the second graphical program comprises a second plurality of objects;
- displaying an indication of said differences on the display;
- wherein said differences are used to evaluate at least one of the first graphical program and the second graphical program.

211. A computer-readable memory medium comprising program instructions for detecting differences between first and second graphical data flow programs, wherein the program instructions execute on a computer including a display, wherein the program instructions are executable to implement:

- determining differences between said first graphical data flow program and said second graphical data flow program, wherein said first graphical data flow program and said second graphical data flow program each comprise graphical code, wherein each of the first and second graphical data flow programs was created in response to user input assembling a plurality of icons and connecting the plurality of icons on a display screen to create the graphical code, wherein the first graphical data flow program comprises a first plurality of objects and wherein the second graphical data flow program comprises a second plurality of objects;
- wherein the first plurality of objects comprises a first object for a variable reference, wherein during display the first graphical data flow program comprises an icon which visually indicates the variable reference in the first graphical data flow program;
- displaying an indication of said differences on the display;
- wherein said differences are used to evaluate at least one of the first graphical data flow program and the second graphical data flow program.

212. A computer-readable memory medium comprising program instructions for detecting differences between first and second graphical programs, wherein the program instructions execute on a computer including a display, wherein the program instructions are executable to implement:

- displaying the first graphical program on the display, wherein the first graphical program comprises a first plurality of objects, wherein at least one of the first plurality of objects visually indicates a string function in the first graphical program;
- determining differences between said first graphical program and said second graphical program, wherein said first graphical program and said second graphical program each comprise graphical code, wherein each of said first and second graphical programs was created in response to user input assembling a plurality of icons and connecting the plurality of icons on a display screen to create the graphical code, wherein the first graphical program comprises the first plurality of objects, wherein the second graphical program comprises a second plurality of objects;
- displaying an indication of said differences on the display;
- wherein said differences are used to evaluate at least one of the first graphical program and the second graphical program.

213. A computer-readable memory medium comprising program instructions for detecting differences between first and second graphical data flow programs, wherein the program instructions execute on a computer including a display screen and an input device, wherein the program instuctions are executable to implement:

determining differences between said first graphical data flow program and said second graphical data flow program, wherein said first graphical data flow program and said second graphical data flow program each comprise graphical code, wherein each of the first and second graphical data flow programs was created in response to user input assembling a plurality of icons and connecting the plurality of icons on a display screen to create the graphical code, wherein the first graphical data flow program comprises a first plurality of objects and wherein the second graphical data flow program comprises a second plurality of objects;

wherein the first plurality of objects comprises a first object which is executable to perform a string function, wherein during display the first graphical data flow program comprises an icon which visually indicates the string function in the first graphical data flow program;

displaying an indication of said differences on the display;

wherein said differences are used to evaluate at least one of the first graphical data flow program and the second graphical data flow program.

214. A computer-readable memory medium comprising program instructions for detecting differences between first and second graphical programs, wherein the program instructions execute on a computer including a display, wherein said program instructions are executable to implement:

displaying the first graphical program on the display, wherein the first graphical program comprises a first plurality of objects, wherein at least one of the first plurality of objects visually indicates a file input/output function in the first graphical program;

determining differences between said first graphical program and said second graphical program, wherein said first graphical program and said second graphical program each comprise graphical code, wherein each of said first and second graphical programs was created in response to user input assembling a plurality of icons and connecting the plurality of icons on a display screen to create the graphical code, wherein the first graphical program comprises the first plurality of objects, wherein the second graphical program comprises a second plurality of objects;

displaying an indication of said differences on the display;

wherein said differences are used to evaluate at least one of the first graphical program and the second graphical program.

215. A computer-readable memory medium comprising program instructions for detecting differences between first and second graphical data flow programs, wherein the program instructions execute on a computer including a display, wherein said program instructions are executable to implement:

determining differences between said first graphical data flow program and said second graphical data flow program, wherein said first graphical data flow program and said second graphical data flow program each comprise graphical code, wherein each of the first and second graphical data flow programs was created in response to user input assembling a plurality of icons and connecting the plurality of icons on a display screen to create the graphical code, wherein the first graphical data flow program comprises a first plurality of objects and wherein the second graphical data flow program comprises a second plurality of objects;

wherein the first plurality of objects comprises a first object which is executable to perform a file input/output function, wherein during display the first graphical data flow program comprises an icon which visually indicates the file input/output fuction in the first graphical data flow program;

displaying an indication of said differences on the display;

wherein said differences are used to evaluate at least one of the first graphical data flow program and the second graphical data flow program.

216. A computer-readable memory medium comprising program instructions for detecting differences between first and second graphical programs, wherein the program instructions execute on a computer including a display, wherein said program instructions are executable to implement:

displaying the first graphical program on the display, wherein the first graphical program comprises a first plurality of objects, wherein at least one of the first plurality of objects visually indicates a communication function in the first graphical program;

determining differences between said first graphical program and said second graphical program, wherein said first graphical program and said second graphical program each comprise graphical code, wherein each of said first and second graphical programs was created in response to user input assembling a plurality of icons and connecting the plurality of icons on a display screen to create the graphical code, wherein the first graphical program comprises the first plurality of objects, wherein the second graphical program comprises a second plurality of objects;

displaying an indication of said differences on the display;

wherein said differences are used to evaluate at least one of the first graphical program and the second grahical program.

217. A computer-readable memory medium comprising program instructions for detecting differences between first and second graphical data flow programs, wherein the program instructions execute on a computer including a display, wherein said program instructions are executable to implement:

determining differences between said first graphical data flow program and said second graphical data flow program, wherein said first graphical data flow program and said second graphical data flow program each comprise graphical code, wherein each of the first and second graphical data flow programs was created in response to user input assembling a plurality of icons and connecting the plurality of icons on a display screen to create the graphical code, wherein the first graphical data flow program comprises a first plurality of objects and wherein the second graphical data flow program comprises a second plurality of objects;

wherein the first plurality of objects comprises a first object which is executable to perform a communication function, wherein during display the first graphical data flow program comprises an icon which visually indicates the communication function in the first graphical data flow program;

displaying an indication of said differences on the display;

wherein said differences are used to evaluate at least one of the first graphical data flow program and the second graphical data flow program.

218. A computer-readable memory medium comprising program instructions for detecting differences between first and second graphical programs, wherein the program instructions execute on a computer including a display, wherein the program instructions are executable to implement:

- determining differences between said first graphical program and said second graphical program, wherein said first graphical program and said second graphical program each comprise graphical code, wherein the first graphical program comprises a first plurality of objects connected by lines, wherein the second graphical program comprises a second plurality of objects connected by lines;
- wherein at least one of the first plurality of objects in the first graphical program comprises a first graphical structure which comprises an interior portion, wherein one or more other objects of the first graphical program are contained within the interior portion of the first graphical structure, wherein the first graphical structure specifies a first type of execution for the one or more other objects contained within the interior portion, and wherein at least one line crosses a border of the first graphical structure;
- displaying an indication of said differences on the display;
- wherein said differences are used to evaluate at least one of the first graphical program and the second graphical program.

219. The computer-readable memory medium of claim 218, wherein the first graphical structure comprises a code execution structure.

220. The computer-readable memory medium of claim 218, wherein the program instructions are executable to implement:

- displaying the first graphical program on the display;
- wherein the one or more other objects are displayed within the interior portion of the first graphical structure in the first graphical program.

221. The computer-readable memory medium of claim 218,

- wherein at least one of the second plurality of objects comprises a second graphical structure which comprises an interior portion, wherein one or more other objects of the second graphical program are contained within the interior portion of the second graphical structure;
- wherein said determining differences between said first graphical program and said second graphical program comprises finding functional differences between the first graphical structure and the second graphical structure, wherein a functional difference indicates a potential difference in execution of the first graphical structure and the second graphical structure.

222. The computer-readable memory medium of claim 218,

- wherein at least one of the second plurality of objects comprises a second graphical structure which comprises an interior portion, wherein one or more other objects of the second graphical program are contained within the interior portion of the second graphical structure;
- wherein said determining differences between said first graphical program and said second graphical program comprises finding cosmetic differences between the first graphical structure and the second graphical structure, wherein a cosmetic difference is a non-functional difference.

223. The computer-readable memory medium of claim 218, wherein the program instructions are executable to implement:

- displaying the first graphical program on the display; and
- displaying the second graphical program on the display.

224. The computer-readable memory medium of claim 218, wherein the program instructions are further executable to implement:

- storing the first graphical program in memory, wherein the first graphical program was created in response to user input selecting first icons for inclusion in the first graphical program, arranging the first icons, and connecting the first icons using the lines;
- storing the second graphical program in memory, wherein the second graphical program was created in response to user input selecting second icons for inclusion in the second graphical program, arranging the second icons, and connecting the second icons using the lines.

225. The computer-readable memory medium of claim 218, wherein said displaying said differences comprises displaying at least one of said first and second graphical programs, wherein said displaying said differences further comprises highlighting each of said differences in one or more of said first and second graphical programs.

226. The computer-readable memory medium of claim 218, wherein said first plurality of objects includes controls and indicators of a user interface portion of the first graphical program.

227. The computer-readable memory medium of claim 218, wherein said first and second graphical programs each comprise a block diagram comprising the graphical code and a user interface for displaying one or more of data output from the block diagram and data input to the block diagram;

- wherein said determining differences between said first graphical program and said second graphical program comprises:
  - determining differences between said block diagrams of said first and second graphical programs; and
  - determining differences between user interface elements of said first and second graphical programs.

228. The computer-readable memory medium of claim 218,

- wherein the first graphical structure specifies iteration of the one or more other objects contained within the interior portion.

229. The computer-readable memory medium of claim 218,

- wherein the first graphical structure specifies conditional branching of the one or more other objects contained within the interior portion.

230. A computer-readable memory medium comprising program instructions for detecting differences between first and second graphical data flow programs, wherein the program instructions execute on a computer including a display, wherein the program instructions are executable to implement:

- determining differences between said first graphical data flow program and said second graphical data flow program, wherein said first graphical data flow program and said second graphical data flow program each comprise graphical code, wherein the first graphical data flow program comprises a first plurality of objects connected by lines, wherein the second graphical data flow program comprises a second plurality of objects connected by lines, wherein, for each of the first and second graphical data flow programs, the lines indicate a flow of data through the respective graphical code;

wherein at least one of the first plurality of objects in the first graphical data flow program comprises a first graphical structure which comprises an interior portion, wherein one or more other objects of the first graphical data flow program are contained within the interior portion of the first graphical structure, wherein the first graphical structure specifies a first type of execution for the one or more other objects contained within the interior portion, and wherein at least one line crosses a border of the first graphical structure;

displaying an indication of said differences on the display;

wherein said differences are used to evaluate at least one of the first graphical data flow program and the second graphical data flow program.

231. The computer-readable memory medium of claim 230, wherein the first graphical structure comprises a code execution structure.

232. The computer-readable memory medium of claim 230, wherein the program instructions are executable to implement:

displaying the first graphical data flow program on the display;

wherein the one or more other objects are displayed within the interior portion of the first graphical structure in the first graphical data flow program.

233. The computer-readable memory medium of claim 230, wherein at least one of the second plurality of objects in the second graphical data flow program comprises a second graphical structure which comprises an interior portion, wherein one or more other objects of the second graphical data flow program are contained within the interior portion of the second graphical structure;

wherein said determining differences between said first graphical data flow program and said second graphical data flow program comprises finding functional differences between the first graphical structure and the second graphical structure, wherein a functional difference indicates a potential difference in execution of the first graphical structure and the second graphical structure.

234. The computer-readable memory medium of claim 230, wherein at least one of the second plurality of objects in the second graphical data flow program comprises a second graphical structure which comprises an interior portion, wherein one or more other objects of the second graphical data flow program are contained within the interior portion of the second graphical structure;

wherein said determining differences between said first graphical data flow program and said second graphical data flow program comprises finding cosmetic differences between the first graphical structure and the second graphical structure, wherein a cosmetic difference is a non-functional difference.

235. A computer-readable memory medium comprising program instructions for detecting differences between first and second graphical programs, wherein the program instructions execute on a computer including a display, wherein the program instructions are executable to implement:

determining differences between said first graphical program and said second graphical program, wherein said first graphical program and said second graphical program each comprise graphical code, wherein the first graphical program comprises a first plurality of objects connected by lines, wherein the second graphical program comprises a second plurality of objects connected by lines, wherein the first graphical program comprises two graphical program portions which do not have data dependencies between them;

displaying an indication of said differences on the display;

wherein said differences are used to evaluate at least one of the first graphical program and the second graphical program.

236. The computer-readable memory medium of claim 235, wherein execution order of the two graphical program portions is not specified.

237. The computer-readable memory medium of claim 235, wherein the two graphical program portions execute in parallel.

238. The computer-readable memory medium of claim 235, wherein said determining differences between said first graphical program and said second graphical program comprises finding functional differences between said first graphical program and said second graphical program, wherein a functional difference indicates a potential difference in execution of said first and second graphical programs.

239. The computer-readable memory medium of claim 235, wherein said determining differences between said first graphical program and said second graphical program comprises finding cosmetic differences between said first and second graphical programs, wherein a cosmetic difference is a non-functional difference.

240. The computer-readable memory medium of claim 235, wherein the program instructions are executable to implement:

displaying the first graphical program on the display; and displaying the second graphical program on the display.

241. The computer-readable memory medium of claim 235, wherein the program instructions are further executable to implement:

storing the first graphical program in memory, wherein the first graphical program was created in response to user input selecting first icons for inclusion in the first graphical program, arranging the first icons, and connecting the first icons using the lines;

storing the second graphical program in memory, wherein the second graphical program was created in response to user input selecting second icons for inclusion in the second graphical program, arranging the second icons, and connecting the second icons using the lines.

242. The computer-readable memory medium of claim 235, wherein said displaying said differences comprises displaying at least one of said first and second graphical programs, wherein said displaying said differences further comprises highlighting each of said differences in one or more of said first and second graphical programs.

243. The computer-readable memory medium of claim 235, wherein the lines represent signals.

244. The computer-readable memory medium of claim 235, wherein said first and second graphical programs each comprise a block diagram comprising the graphical code and a user interface for displaying one or more of data output from the block diagram and data input to the block diagram;

wherein said determining differences between said first graphical program and said second graphical program comprises:

determining differences between said block diagrams of said first and second graphical programs; and determining differences between user interface elements of said first and second graphical programs.

245. A computer-readable memory medium comprising program instructions for detecting differences between first and second graphical data flow programs, wherein the program instructions execute on a computer including a display, wherein the program instructions are executable to implement:

determining differences between said first graphical data flow program and said second graphical data flow program, wherein said first graphical data flow program and said second graphical data flow program each comprise graphical code, wherein the first graphical data flow program comprises a first plurality of objects connected by lines, wherein the second graphical data flow program comprises a second plurality of objects connected by lines, wherein, for each of the first and second graphical data flow programs, the lines indicate a flow of data among the respective objects, and wherein the first graphical data flow program comprises two graphical data flow program portions which do not have data dependencies between them;

displaying an indication of said differences on the display;

wherein said differences are used to evaluate at least one of the first graphical data flow program and the second graphical data flow program.

246. The computer-readable memory medium of claim 245, wherein execution order of the two graphical data flow program portions is not specified.

247. The computer-readable memory medium of claim 245, wherein the two graphical data flow program portions execute in parallel.

248. The computer-readable memory medium of claim 245, wherein said determining differences between said first graphical data flow program and said second graphical data flow program comprises finding functional differences between said first graphical data flow program and said second graphical data flow program, wherein a functional difference indicates a potential difference in execution of said first and second graphical data flow programs.

249. The computer-readable memory medium of claim 245, wherein said determining differences between said first graphical data flow program and said second graphical data flow program comprises finding cosmetic differences between said first and second graphical data flow programs, wherein a cosmetic difference is a non-functional difference.

250. The computer-readable memory medium of claim 245, wherein the program instructions are executable to implement:

displaying the first graphical data flow program on the display; and displaying the second graphical data flow program on the display.

251. The computer-readable memory medium of claim 245, wherein the program instructions are further executable to implement:

storing the first graphical data flow program in memory, wherein the first graphical data flow program was created in response to user input selecting first icons for inclusion in the first graphical data flow program, arranging the first icons, and connecting the first icons using the lines;

storing the second graphical data flow program in memory, wherein the second graphical data flow program was created in response to user input selecting second icons for inclusion in the second graphical data flow program, arranging the second icons, and connecting the second icons using the lines.

252. The computer-readable memory medium of claim 245, wherein said displaying said differences comprises displaying at least one of said first and second graphical data flow programs, wherein said displaying said differences further comprises highlighting each of said differences in one or more of said first and second graphical data flow programs.

253. The computer-readable memory medium of claim 245, wherein the lines represent signals.

254. The computer-readable memory medium of claim 245, wherein said first and second graphical data flow programs each comprise a block diagram comprising the graphical code and a user interface for displaying one or more of data output from the block diagram and data input to the block diagram;

wherein said determining differences between said first graphical data flow program and said second graphical data flow program comprises:

determining differences between said block diagrams of said first and second graphical data flow programs; and determining differences between user interface elements of said first and second graphical data flow programs.

255. A computer-readable memory medium comprising program instructions for detecting differences between first and second graphical programs, wherein the program instructions execute on a computer including a display screen and an input device, wherein the program instructions are executable to implement:

determining differences between said first graphical program and said second graphical program, wherein said first graphical program and said second graphical program each comprise graphical code, wherein the first graphical program comprises a first plurality of objects, wherein the second graphical program comprises a second plurality of objects, and wherein at least one of the first plurality of objects comprises a first graphical structure which includes one or more other objects;

displaying an indication of said differences on the display;

wherein said differences are used to evaluate at least one of the first graphical program and the second graphical program.

256. A computer-readable memory medium comprising program instructions for detecting differences between first and second graphical data flow programs, wherein the program instructions execute on a computer including a display, wherein the program instructions are executable to implement:

determining differences between said first graphical data flow program and said second graphical data flow program, wherein said first graphical data flow program and said second graphical data flow program each comprise graphical code, wherein the first graphical data flow program comprises a first plurality of objects connected by lines, wherein the second graphical data flow program comprises a second plurality of objects connected by lines, wherein the lines indicate that data produced by one object is used by another object, and wherein at least one of the first plurality of objects comprises a first graphical structure which includes one or more other objects;

displaying an indication of said differences on the display screen;

wherein said differences are used to evaluate at least one of the first graphical data flow program and the second graphical data flow program.

257. A computer-readable memory medium comprising program instructions for detecting differences between first and second graphical programs, wherein the program instructions execute on a computer including a display, wherein the program instructions are executable to implement:

receiving user input specifying a type of differencing to perform between said first and second graphical programs;

determining differences between said first graphical program and said second graphical program, wherein said first graphical program and said second graphical program each comprise graphical code, wherein the first graphical program comprises a first plurality of objects, wherein the second graphical program comprises a second plurality of objects, wherein said determining differences is based on the user input specifying the type of differencing;

displaying an indication of said differences on the display;

wherein said differences are used to evaluate at least one of the first graphical program and the second graphical program.

258. The memory medium of claim 257, wherein the user input specifies cosmetic differencing, wherein said determining differences comprises determining cosmetic differences between said first and second graphical programs.

259. The memory medium of claim 257, wherein the user input specifies cosmetic differencing of block diagrams of the first and second graphical programs, wherein said determining differences comprises determining cosmetic differences between said block diagrams of said first and second graphical programs.

260. The memory medium of claim 257, wherein the user input specifies cosmetic differencing of user interfaces of the first and second graphical program, wherein said determining differences comprises determining cosmetic differences between said user interfaces of said first and second graphical programs.

261. The memory medium of claim 257, wherein the user input specifies attribute differencing, wherein said determining differences comprises determining attribute differences between said first and second graphical programs.

262. The memory medium of claim 257, wherein the user input specifies position differencing, wherein said determining differences comprises determining position differences between corresponding objects of said first and second graphical programs.

263. The memory medium of claim 257, wherein the user input specifies size differencing, wherein said determining differences comprises determining size differences between corresponding objects of said first and second graphical programs.

264. The memory medium of claim 257, wherein the user input specifies position differencing of block diagrams of said first and second graphical programs, wherein said determining differences comprises determining position differences between corresponding objects of said block diagrams of said first and second graphical programs.

265. The memory medium of claim 257, wherein the user input specifies position differencing of user interfaces of said first and second graphical programs, wherein said determining differences comprises determining position differences between corresponding objects of said user interfaces of said first and second graphical programs.

266. The memory medium of claim 257, wherein the user input specifies size differencing of block diagrams of said first and second graphical programs, wherein said determining differences comprises determining size differences between corresponding objects of said block diagrams of said first and second graphical programs.

267. The memory medium of claim 257, wherein the user input specifies size differencing of user interfaces of said first and second graphical programs, wherein said determining differences comprises determining size differences between corresponding objects of said user interfaces of said first and second graphical programs.

268. The memory medium of claim 257, wherein the user input specifies differencing of block diagrams of the first and second graphical programs;

wherein said determining differences comprises determining differences between the block diagrams of the first and second graphical programs.

269. The memory medium of claim 257, wherein the user input specifies differencing of user interfaces of the first and second graphical programs;

wherein said determining differences comprises determining differences between the user interfaces of the first and second graphical programs.

270. The memory medium of claim 257, wherein the first graphical program comprises a first block diagram and a first user interface;

wherein the second graphical program comprises a second block diagram and a second user interface;

wherein the user input specifies differencing of the block diagrams and no differencing of the user interfaces;

wherein said determining differences comprises determining differences between the first and second block diagrams;

wherein said determining differences does not determine differences between the first and second user interfaces.

271. The memory medium of claim 257, wherein the first graphical program comprises a first block diagram and a first user interface;

wherein the second graphical program comprises a second block diagram and a second user interface;

wherein the user input specifies differencing of the user interfaces and no differencing of the block diagrams;

wherein said determining differences comprises determining differences between the first and second user interfaces;

wherein said determining differences does not determine differences between the first and second block diagrams.

272. The memory medium of claim 257, wherein the first graphical program is a first graphical data flow program;

wherein the second graphical program is a second graphical data flow program.

273. A computer-readable memory medium comprising program instructions for detecting differences between first and second graphical programs, wherein the program instructions execute on a computer including a display, wherein the program instructions are executable to implement:
- determining differences between said first graphical program and said second graphical program, wherein said first graphical program and said second graphical program each comprise graphical code, wherein the first graphical program comprises a first plurality of objects, wherein the second graphical program comprises a second plurality of objects, and wherein said determining differences comprises determining positional differences between corresponding objects of said first and second graphical programs;
- displaying an indication of said differences on the display;
- wherein said differences are used to evaluate at least one of the first graphical program and the second graphical program.

274. A computer-readable memory medium comprising program instructions for detecting differences between first and second graphical data flow programs, wherein the program instructions execute on a computer including a display, wherein the program instructions are executable to implement:
- determining differences between said first graphical data flow program and said second graphical data flow program, wherein said first graphical data flow program and said second graphical data flow program each comprise graphical code, wherein the first graphical data flow program comprises a first plurality of objects connected by lines, wherein the lines connecting the first plurality of objects indicate flow of data among the first plurality of objects, wherein the second graphical data flow program comprises a second plurality of objects connected by lines, wherein the lines connecting the second plurality of objects indicate flow of data among the second plurality of objects, and wherein said determining differences comprises determining positional differences between corresponding objects of said first and second graphical data flow programs;
- displaying an indication of said differences on the display screen;
- wherein said differences are used to evaluate at least one of the first graphical data flow program and the second graphical data flow program.

275. A computer-readable memory medium comprising program instructions for detecting differences between first and second graphical programs, wherein the program instructions execute on a computer including a display, wherein the program instructions are executable to implement:
- determining differences between said first graphical program and said second graphical program, wherein said first graphical program and said second graphical program each comprise graphical code, wherein the first graphical program comprises a first plurality of objects, wherein the second graphical program comprises a second plurality of objects, and wherein said determining differences comprises determining color differences between corresponding objects of said first and second graphical programs; and
- displaying an indication of said differences on the display;
- wherein said differences are used to evaluate at least one of the first graphical program and the second graphical program.

276. A computer-readable memory medium comprising program instructions for detecting differences between first and second graphical programs, wherein the program instructions execute on a computer including a display, wherein the program instructions are executable to implement:
- determining differences between said first graphical program and said second graphical program, wherein said first graphical program and said second graphical program each comprise graphical code, wherein the first graphical program comprises a first plurality of objects, wherein the second graphical program comprises a second plurality of objects, and wherein said determining differences comprises determining size differences between corresponding objects of said first and second graphical programs; and
- displaying an indication of said differences on the display;
- wherein said differences are used to evaluate at least one of the first graphical program and the second graphical program.

277. A computer-implemented method for detecting differences between first and second graphical programs, wherein the method executes on a computer including a display, the method comprising:
- determining differences between said first graphical program and said second graphical program, wherein said first graphical program and said second graphical program each comprise graphical code, wherein said first and second graphical programs each comprise a block diagram comprising graphical code and a user interface panel for displaying one or more of data output from the block diagram and data input to the block diagram, wherein said determining differences between said first graphical program and said second graphical program comprises:
  - determining differences between said block diagrams of said first and second graphical programs;
  - determining differences between said user interface panels of said first and second graphical programs; and
- displaying an indication of said differences on the display;
- wherein said differences are used to evaluate at least one of the first graphical program and the second graphical program.

278. The computer-implemented method of claim 277, wherein said determining differences between said first and second graphical programs comprises finding functional differences between said first and second graphical programs, wherein a functional difference indicates a potential difference in execution of said first and second graphical programs.

279. The computer-implemented method of claim 277, wherein said determining differences between said first and second graphical programs comprises finding cosmetic differences between said first and second graphical programs, wherein a cosmetic difference is a non-functional difference.

280. The computer-implemented method of claim 277, further comprising:
- displaying the first graphical program on the display screen; and
- displaying the second graphical program on the display screen.

281. The computer-implemented method of claim 277, wherein the first graphical program was created in response to user input, and wherein the second graphical program was created in response to user input.

282. The computer-implemented method of claim 277, further comprising:

storing the first graphical program in memory, wherein the first graphical program was created in response to user input selecting first icons for inclusion in the first graphical program, arranging the first icons, and connecting the first icons using lines;

storing the second graphical program in memory, wherein the second graphical program was created in response to user input selecting second icons for inclusion in the second graphical program, arranging the second icons, and connecting the second icons using lines.

283. The computer-implemented method of claim 277, further comprising:

storing the first graphical program in memory, wherein the first graphical program was created in response to user input selecting first icons for inclusion in the first graphical program, arranging the first icons, and connecting the first icons using lines;

storing the second graphical program in memory, wherein the second graphical program was created in response to user input modifying the first graphical program.

284. The computer-implemented method of claim 277, wherein said displaying said differences comprises displaying at least one of said first and second graphical programs, wherein said displaying said differences further comprises highlighting at least a subset of said differences in one or more of said first and second graphical programs.

285. The computer-implemented method of claim 277, wherein said first graphical program comprises a plurality of objects, and wherein said first plurality of objects includes controls and indicators of the user interface panels of the first graphical program.

286. A computer-readable memory medium comprising program instructions for detecting differences between first and second graphical programs, wherein the program instructions execute on a computer including a display, wherein the program instructions are executable to implement:

determining differences between said first graphical program and said second graphical program, wherein said first graphical program and said second graphical program each comprise graphical code, wherein said first and second graphical programs each comprise a block diagram comprising graphical code and a user interface panel for displaying one or more of data output from the block diagram and data input to the block diagram, wherein said determining differences between said first graphical program and said second graphical program comprises:

determining differences between said block diagrams of said first and second graphical programs;

determining differences between said user interface panels of said first and second graphical programs; and displaying an indication of said differences on the display; wherein the differences are used to evaluate at least one of the first graphical program and the second graphical program.

287. The memory medium of claim 286, wherein said determining differences between said first and second graphical programs comprises finding functional differences between said first and second graphical programs, wherein a functional difference indicates a potential difference in execution of said first and second graphical programs.

288. The memory medium of claim 286, wherein said determining differences between said first and second graphical programs comprises finding cosmetic differences between said first and second graphical programs, wherein a cosmetic difference is a non-functional difference.

289. The memory medium of claim 286, wherein the program instructions are further executable to implement:

displaying the first graphical program on the display screen; and displaying the second graphical program on the display screen.

290. The memory medium of claim 286, wherein the first graphical program was created in response to user input, and wherein the second graphical program was created in response to user input.

291. The memory medium of claim 286, wherein the program instructions are further executable to implement:

storing the first graphical program in memory, wherein the first graphical program was created in response to user input selecting first icons for inclusion in the first graphical program, arranging the first icons, and connecting the first icons using lines;

storing the second graphical program in memory, wherein the second graphical program was created in response to user input selecting second icons for inclusion in the second graphical program, arranging the second icons, and connecting the second icons using lines.

292. The memory medium of claim 286, wherein the program instructions are further executable to implement:

storing the first graphical program in memory, wherein the first graphical program was created in response to user input selecting first icons for inclusion in the first graphical program, arranging the first icons, and connecting the first icons using lines;

storing the second graphical program in memory, wherein the second graphical program was created in response to user input modifying the first graphical program.

293. The memory medium of claim 286, wherein said displaying said differences comprises displaying at least one of said first and second graphical programs, wherein said displaying said differences further comprises highlighting at least a subset of said differences in one or more of said first and second graphical programs.

294. The memory medium of claim 286, wherein said first graphical program comprises a plurality of objects, and wherein said first plurality of objects includes controls and indicators of the user interface panels of the first graphical program.

* * * * *